US012671146B2

(12) United States Patent
Min et al.

(10) Patent No.: US 12,671,146 B2
(45) Date of Patent: Jun. 30, 2026

(54) BATTERY, AND BATTERY PACK AND VEHICLE COMPRISING THE SAME

(71) Applicant: LG ENERGY SOLUTION, LTD., Seoul (KR)

(72) Inventors: Geon-Woo Min, Daejeon (KR); Hae-Jin Lim, Daejeon (KR); Do-Gyun Kim, Daejeon (KR); Kwang-Su Hwangbo, Daejeon (KR); Min-Ki Jo, Daejeon (KR); Bo-Hyun Kang, Daejeon (KR); Su-Ji Choi, Daejeon (KR); Jae-Won Lim, Daejeon (KR); Hak-Kyun Kim, Daejeon (KR); Je-Jun Lee, Daejeon (KR); Ji-Min Jung, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 537 days.

(21) Appl. No.: 18/277,860

(22) PCT Filed: Feb. 18, 2022

(86) PCT No.: PCT/KR2022/002470
§ 371 (c)(1),
(2) Date: Aug. 18, 2023

(87) PCT Pub. No.: WO2022/177379
PCT Pub. Date: Aug. 25, 2022

(65) Prior Publication Data
US 2024/0128590 A1 Apr. 18, 2024

(30) Foreign Application Priority Data

Feb. 19, 2021 (KR) ........................ 10-2021-0022881
Feb. 19, 2021 (KR) ........................ 10-2021-0022893
(Continued)

(51) Int. Cl.
H01M 50/474 (2021.01)
H01M 10/04 (2006.01)

(52) U.S. Cl.
CPC ..... H01M 50/474 (2021.01); H01M 10/0413 (2013.01); H01M 10/0431 (2013.01); *H01M 2220/20* (2013.01)

(58) Field of Classification Search
CPC ........... H01M 50/474; H01M 10/0413; H01M 10/0431; H01M 50/593; H01M 2220/20
(Continued)

(56) References Cited

U.S. PATENT DOCUMENTS 4,322,484 A 3/1982 Sugalski
4,563,551 A 1/1986 Black et al.
(Continued)

FOREIGN PATENT DOCUMENTS

CN 2681364 Y 2/2005
CN 1618140 A 5/2005
(Continued)

OTHER PUBLICATIONS

International Search Report (PCT/ISA/210) issued in PCT/KR2022/002470, dated Jun. 13, 2022.
(Continued)

*Primary Examiner* — James M Erwin
(74) *Attorney, Agent, or Firm* — Birch, Stewart, Kolasch & Birch, LLP

(57) ABSTRACT

A battery includes an electrode assembly including a first electrode, a second electrode and a separator between the first electrode and the second electrode wound around a winding axis to define a core and an outer circumferential surface, the first electrode including a first uncoated region in which an active material layer is not coated along a winding direction; a housing accommodating the electrode
(Continued)

assembly through an open portion at a lower end thereof; a first current collector coupled to the first uncoated region and disposed in the housing; a cap to cover the open portion; and a spacer between the first current collector and the cap and having a height corresponding to a distance between the first current collector and the cap.

34 Claims, 14 Drawing Sheets

(30)       Foreign Application Priority Data

| Feb. 23, 2021 | (KR) | ........................ 10-2021-0024424 |
| Mar. 8, 2021 | (KR) | ........................ 10-2021-0030291 |
| Oct. 1, 2021 | (KR) | ........................ 10-2021-0131207 |
| Oct. 1, 2021 | (KR) | ........................ 10-2021-0131208 |

(58) Field of Classification Search
    USPC ......................................................... 429/94
    See application file for complete search history.

(56)       References Cited

U.S. PATENT DOCUMENTS

| 5,665,483 | A | 9/1997 | Saito et al. |
| 6,132,900 | A | 10/2000 | Yoshizawa et al. |
| 6,677,082 | B2 | 1/2004 | Thackeray et al. |
| 6,680,143 | B2 | 1/2004 | Thackeray et al. |
| 8,580,425 | B2 | 11/2013 | Kim |
| 9,368,768 | B1 * | 6/2016 | Maglica .............. H01M 10/287 |
| 2001/0004505 | A1 | 6/2001 | Kim et al. |
| 2001/0051297 | A1 | 12/2001 | Nemoto et al. |
| 2002/0058184 | A1 | 5/2002 | Hayashi et al. |
| 2003/0049536 | A1 | 3/2003 | Wiepen |
| 2003/0104276 | A1 | 6/2003 | Mizuno et al. |
| 2004/0023108 | A1 | 2/2004 | Nakanishi et al. |
| 2005/0048365 | A1 | 3/2005 | Miyahisa et al. |
| 2005/0118499 | A1 | 6/2005 | Kim |
| 2005/0158620 | A1 | 7/2005 | Kim et al. |
| 2005/0181272 | A1 | 8/2005 | Kim |
| 2005/0214640 | A1 | 9/2005 | Kim |
| 2005/0238951 | A1 | 10/2005 | Yoo et al. |
| 2005/0260487 | A1 | 11/2005 | Kim et al. |
| 2005/0287428 | A1 | 12/2005 | Cheon et al. |
| 2006/0063063 | A1 | 3/2006 | Mori et al. |
| 2006/0286447 | A1 | 12/2006 | Kim |
| 2007/0009785 | A1 | 1/2007 | Kozuki et al. |
| 2008/0182159 | A1 | 7/2008 | Mitani et al. |
| 2009/0011329 | A1 | 1/2009 | Yoon |
| 2009/0136835 | A1 | 5/2009 | Nakai et al. |
| 2009/0208830 | A1 | 8/2009 | Okabe et al. |
| 2010/0112434 | A1 | 5/2010 | Akou et al. |
| 2010/0151317 | A1 | 6/2010 | Kim et al. |
| 2010/0159308 | A1 | 6/2010 | Kim et al. |
| 2010/0316897 | A1 | 12/2010 | Kozuki et al. |
| 2011/0027644 | A1 | 2/2011 | Kiyama |
| 2011/0086252 | A1 | 4/2011 | Phillips |
| 2011/0281155 | A1 | 11/2011 | Ito et al. |
| 2012/0100406 | A1 | 4/2012 | Gaugler |
| 2012/0328932 | A1 | 12/2012 | Guen et al. |
| 2013/0040178 | A1 | 2/2013 | Lim |
| 2013/0183556 | A1 | 7/2013 | Kim |
| 2013/0273401 | A1 | 10/2013 | Lee et al. |
| 2013/0323574 | A1 | 12/2013 | Tsunaki et al. |
| 2014/0186692 | A1 | 7/2014 | Kim et al. |
| 2014/0205868 | A1 | 7/2014 | Phillips |
| 2015/0104694 | A1 | 4/2015 | Okuda et al. |
| 2015/0155532 | A1 | 6/2015 | Harayama et al. |
| 2015/0295270 | A1 * | 10/2015 | Chun .................. H01M 50/534 |
| | | | 429/211 |
| 2015/0364735 | A1 | 12/2015 | Kohira et al. |
| 2016/0155998 | A1 | 6/2016 | Wakimoto et al. |
| 2016/0181577 | A1 | 6/2016 | Kajiwara et al. |

| 2017/0062789 | A1 | 3/2017 | Sim et al. |
| 2017/0133645 | A1 | 5/2017 | Miyata et al. |
| 2017/0149042 | A1 | 5/2017 | Koo et al. |
| 2017/0200935 | A1 | 7/2017 | Hong et al. |
| 2017/0256769 | A1 | 9/2017 | Wynn et al. |
| 2017/0271643 | A1 | 9/2017 | Wintner |
| 2018/0062123 | A1 | 3/2018 | Ikeda et al. |
| 2018/0130995 | A1 | 5/2018 | Nemoto et al. |
| 2018/0182560 | A1 | 6/2018 | Khakhalev |
| 2018/0219208 | A1 | 8/2018 | Dewulf et al. |
| 2019/0221791 | A1 | 7/2019 | Wakimoto |
| 2019/0355958 | A1 * | 11/2019 | Tsuji ....................... H01M 4/04 |
| 2019/0386272 | A1 | 12/2019 | Shin et al. |
| 2020/0044289 | A1 | 2/2020 | Pasma et al. |
| 2020/0119328 | A1 | 4/2020 | Zheng et al. |
| 2020/0127249 | A1 | 4/2020 | Yoon et al. |
| 2020/0212374 | A1 | 7/2020 | Gaugler |
| 2020/0235369 | A1 | 7/2020 | Jeong et al. |
| 2020/0295341 | A1 | 9/2020 | Kim et al. |
| 2021/0021007 | A1 | 1/2021 | Park et al. |
| 2021/0039195 | A1 | 2/2021 | Jost et al. |
| 2021/0075051 | A1 | 3/2021 | Zhou |
| 2021/0257652 | A1 | 8/2021 | Ko et al. |
| 2021/0278479 | A1 | 9/2021 | Park et al. |
| 2021/0280835 | A1 | 9/2021 | Peng et al. |
| 2022/0037712 | A1 | 2/2022 | Kritzer et al. |
| 2022/0069335 | A1 | 3/2022 | Kim |
| 2022/0102805 | A1 | 3/2022 | Miyata et al. |
| 2022/0131216 | A1 | 4/2022 | Park et al. |
| 2022/0255204 | A1 | 8/2022 | Chun et al. |
| 2023/0246223 | A1 * | 8/2023 | Wu ................... H01M 10/0409 |
| | | | 429/163 |
| 2024/0322399 | A1 | 9/2024 | Min et al. |
| 2024/0356123 | A1 | 10/2024 | Ko et al. |

FOREIGN PATENT DOCUMENTS

| CN | 1713440 | A | 12/2005 |
| CN | 1832228 | A | 9/2006 |
| CN | 101083317 | A | 12/2007 |
| CN | 201066701 | Y | 5/2008 |
| CN | 201466087 | U | 5/2010 |
| CN | 101188311 | B | 9/2010 |
| CN | 201781028 | U | 3/2011 |
| CN | 103427063 | A | 12/2013 |
| CN | 103579687 | A | 2/2014 |
| CN | 104396044 | A | 3/2015 |
| CN | 204596910 | U | 8/2015 |
| CN | 105655623 | A | 6/2016 |
| CN | 106030855 | A | 10/2016 |
| CN | 205863251 | U | 1/2017 |
| CN | 206461019 | U | 9/2017 |
| CN | 206461044 | U | 9/2017 |
| CN | 206619636 | U | 11/2017 |
| CN | 107482156 | A | 12/2017 |
| CN | 207217654 | U | 4/2018 |
| CN | 108063192 | A | 5/2018 |
| CN | 110048065 | A | 7/2019 |
| CN | 110459705 | A | 11/2019 |
| CN | 110710019 | A | 1/2020 |
| CN | 209912959 | U | 1/2020 |
| CN | 111446386 | A | 7/2020 |
| CN | 111584771 | A | 8/2020 |
| CN | 211350864 | U | 8/2020 |
| CN | 111668534 | A | 9/2020 |
| CN | 111952525 | A | 11/2020 |
| CN | 211879534 | U | 11/2020 |
| CN | 212136494 | U | 12/2020 |
| CN | 212303743 | U | 1/2021 |
| CN | 212434731 | U | 1/2021 |
| CN | 112310574 | A | 2/2021 |
| CN | 113346201 | A | 9/2021 |
| CN | 215342666 | U | 12/2021 |
| CN | 114865242 | A | 8/2022 |
| DE | 10 2018 130 173 | A1 | 5/2020 |
| EP | 2876338 | A1 | 5/2015 |
| EP | 3933994 | A1 | 5/2022 |
| EP | 4087034 | A1 | 11/2022 |
| EP | 4 293 802 | A1 | 12/2023 |

(56) References Cited

FOREIGN PATENT DOCUMENTS

| | | | |
|---|---|---|---|
| EP | 4336649 | A1 | 3/2024 |
| JP | 48-34834 | Y2 | 10/1973 |
| JP | 7-201309 | A | 8/1995 |
| JP | 8-102313 | A | 4/1996 |
| JP | 8-180849 | A | 7/1996 |
| JP | 10-92469 | A | 4/1998 |
| JP | 10-106532 | A | 4/1998 |
| JP | 10-214609 | A | 8/1998 |
| JP | 11-67279 | A | 3/1999 |
| JP | 11-297301 | A | 10/1999 |
| JP | 2955135 | B2 | 10/1999 |
| JP | 2001-28274 | A | 1/2001 |
| JP | 2002-141099 | A | 5/2002 |
| JP | 2003-7346 | A | 1/2003 |
| JP | 2003-100279 | A | 4/2003 |
| JP | 2004-14173 | A | 1/2004 |
| JP | 2004-247192 | A | 9/2004 |
| JP | 2004-362956 | A | 12/2004 |
| JP | 2005-100927 | A | 4/2005 |
| JP | 2005-276840 | A | 10/2005 |
| JP | 3718872 | B2 | 11/2005 |
| JP | 2006-331993 | A | 12/2006 |
| JP | 2007-18962 | A | 1/2007 |
| JP | 2008-192552 | A | 8/2008 |
| JP | 2009-110885 | A | 5/2009 |
| JP | 2009-123438 | A | 6/2009 |
| JP | 4346637 | B2 | 10/2009 |
| JP | 2009-259452 | A | 11/2009 |
| JP | 4401634 | B2 | 1/2010 |
| JP | 2010-33940 | A | 2/2010 |
| JP | 2010-135304 | A | 6/2010 |
| JP | 4501361 | B2 | 7/2010 |
| JP | 2011-159582 | A | 8/2011 |
| JP | 2011-216297 | A | 10/2011 |
| JP | 2012-134108 | A | 7/2012 |
| JP | 2014-132552 | A | 7/2014 |
| JP | 2015-106613 | A | 6/2015 |
| JP | 5877724 | B2 | 3/2016 |
| JP | 2016-100323 | A | 5/2016 |
| JP | 5935878 | B2 | 6/2016 |
| JP | 2016-195036 | A | 11/2016 |
| JP | 2016-225014 | A | 12/2016 |
| JP | 6250567 | B2 | 12/2017 |
| JP | 2018-525781 | A | 9/2018 |
| JP | 2019-46639 | A | 3/2019 |
| JP | 2020-71898 | A | 5/2020 |
| JP | 6735445 | B2 | 8/2020 |
| KR | 2000-0051436 | A | 8/2000 |
| KR | 10-2001-0038811 | A | 5/2001 |
| KR | 2001-0056363 | A | 7/2001 |
| KR | 10-2005-0121914 | A | 12/2005 |
| KR | 10-0551885 | B1 | 2/2006 |
| KR | 10-2006-0022128 | A | 3/2006 |
| KR | 10-2006-0111837 | A | 10/2006 |
| KR | 10-0709870 | B1 | 4/2007 |
| KR | 10-2009-003702 | A | 1/2009 |
| KR | 10-2010-0068080 | A | 6/2010 |
| KR | 10-2010-0075177 | A | 7/2010 |
| KR | 10-2010-0089092 | A | 8/2010 |
| KR | 10-1265199 | B1 | 5/2013 |
| KR | 10-2013-0084086 | A | 7/2013 |
| KR | 10-1320581 | B1 | 10/2013 |
| KR | 10-1446151 | B1 | 10/2014 |
| KR | 10-2015-0117135 | A | 10/2015 |
| KR | 10-2015-0134566 | A | 12/2015 |
| KR | 10-2016-0024685 | A | 3/2016 |
| KR | 10-2016-0043725 | A | 4/2016 |
| KR | 10-1679413 | B1 | 11/2016 |
| KR | 10-2017-0025074 | A | 3/2017 |
| KR | 10-2017-0033543 | A | 3/2017 |
| KR | 10-1743136 | B1 | 6/2017 |
| KR | 10-2017-0101653 | A | 9/2017 |
| KR | 10-1839158 | B1 | 3/2018 |
| KR | 10-2018-0129115 | A | 12/2018 |
| KR | 10-2019-0040699 | A | 4/2019 |
| KR | 10-2019-0078094 | A | 7/2019 |
| KR | 10-2020-0007561 | A | 1/2020 |
| KR | 10-2020-0020173 | A | 2/2020 |
| KR | 10-2020-0037599 | A | 4/2020 |
| KR | 10-2020-0039214 | A | 4/2020 |
| KR | 10-2126970 | B1 | 6/2020 |
| KR | 10-2020-0086957 | A | 7/2020 |
| KR | 10-2020-0094453 | A | 8/2020 |
| KR | 10-2020-0102777 | A | 9/2020 |
| KR | 10-2149886 | B1 | 9/2020 |
| KR | 10-2021-0012636 | A | 2/2021 |
| WO | WO 2006/085437 | A1 | 8/2006 |
| WO | WO 2010/146154 | A2 | 12/2010 |
| WO | WO 2013/024774 | A1 | 2/2013 |
| WO | WO 2015/025388 | A1 | 2/2015 |

OTHER PUBLICATIONS

U.S. Office Action for U.S. Appl. No. 17/592,576, dated Mar. 31, 2025.

European Office Action issued in European Patent Application No. 23215214.0, dated Nov. 21, 2024.

Extended European Search Report issued in European Patent Application No. 22152250.1, dated Aug. 5, 2022.

Extended European Search Report issued in European Patent Application No. 22742834.9, dated Feb. 10, 2025.

Extended European Search Report issued in European Patent Application No. 23215214.0, dated Jan. 23, 2024.

Partial Supplementary European Search Report issued in European Patent Application No. 22742840.6, dated Jul. 15, 2024.

Third Party Observation issued in European Patent Application No. 22742834.9, dated Apr. 25, 2024.

Third Party Observation issued in European Patent Application No. 22742834.9, dated Feb. 13, 2024.

Third Party Observation issued in European Patent Application No. 22742840.6, dated Apr. 17, 2024.

Third Party Observation issued in European Patent Application No. 22742840.6, dated Feb. 5, 2024.

Third Party Submission issued in U.S. Appl. No. 17/592,576, dated Apr. 4, 2024.

U.S. Office Action issued in U.S. Appl. No. 17/592,576, dated Oct. 17, 2024.

U.S. Office Action issued in U.S. Appl. No. 17/592,594, dated Nov. 24, 2023.

U.S. Office Action issued in U.S. Appl. No. 18/086,402, dated Jun. 12, 2024.

U.S. Office Action issued in U.S. Appl. No. 18/086,402, dated Oct. 28, 2024.

Extended European Search Report for European Application No. 22756575.1, dated Mar. 27, 2025.

* cited by examiner

BATTERY, AND BATTERY PACK AND VEHICLE COMPRISING THE SAME

TECHNICAL FIELD

The present disclosure relates to a battery and a battery pack and a vehicle comprising the same. More particularly, the present disclosure relates to a battery having a structure capable of minimizing the movement of an electrode assembly inside thereof, and a battery pack and a vehicle comprising the same.

The present application claims the benefit of Korean Patent Application No. 10-2021-0022881 filed on Feb. 19, 2021, Korean Patent Application No. 10-2021-0022893 filed on Feb. 19, 2021, Korean Patent Application No. 10-2021-0024424 filed on Feb. 23, 2021, Korean Patent Application No. 10-2021-0030291 filed on Mar. 8, 2021, Korean Patent Application No. 10-2021-0131207 filed on Oct. 1, 2021 and Korean Patent Application No. 10-2021-0131208 filed on Oct. 1, 2021 with the Korean Intellectual Property Office, the disclosure of which is incorporated herein by reference in its entirety.

BACKGROUND ART

In a battery, an electrode assembly having a positive electrode tab and a negative electrode tab extending upward and downward along the longitudinal direction of a housing respectively may be applied to maximize the current collection efficiency. In the battery to which the electrode assembly having this structure is applied, a current collector may be used as an intermediary to connect the positive electrode tab and the negative electrode tab to a terminal and the housing respectively.

In this case, for example, the positive electrode current collector may be coupled to the positive electrode tab while covering one surface of the electrode assembly, and the negative electrode current collector may be coupled to the negative electrode tab while covering the other surface of the electrode assembly. Additionally, the positive electrode current collector may be electrically connected to the terminal, and the negative electrode current collector may be electrically connected to the housing.

The battery having the above-described structure may have a relatively large empty space, in particular, between the negative electrode current collector and a cap. Additionally, there may be another empty space between the bottom of the housing opposite the cap and the positive electrode current collector.

These empty spaces may cause the electrode assembly to move within the housing, in particular, along the vertical direction, i.e., the heightwise direction of the battery. When the electrode assembly moves in the vertical direction, damage may occur to the coupling part between the current collector and the electrode tab, and moreover, damage may occur to the coupling part between the current collector and the housing and the coupling part between the current collector and the terminal. For example, when the electrode assembly vibrates up and down, the electrode tab bends and stretches repeatedly and may finally break, causing a short circuit in the battery.

Accordingly, it is necessary to minimize the movement space of the electrode assembly. Additionally, when an additional component is applied to reduce the movement space of the electrode assembly, the procedural complexity may increase and the manufacturing cost may rise, and accordingly there is a need to solve the problem by making use of the existing component.

DISCLOSURE

Technical Problem

The present disclosure is designed to solve the above-described problem, and therefore the present disclosure is designated to prevent damage to an electrical coupling part caused by the movement of an electrode assembly in a housing of a battery.

However, the technical problem of the present disclosure is not limited to the above-described problem, and other problems not mentioned herein will be clearly understood by those skilled in the art from the following description.

Technical Solution

To solve the above-described problem, a battery according to an embodiment of the present disclosure includes an electrode assembly including a first electrode, a second electrode and a separator between the first electrode and the second electrode, the first electrode, the second electrode and the separator being wound around a winding axis to define a core and an outer circumferential surface of the electrode assembly, the first electrode having a first uncoated region in which an active material layer is not coated along a winding direction; a housing accommodating the electrode assembly through an open portion at a lower end of the housing; a first current collector coupled to the first uncoated region, the first current collector being disposed in the housing; a cap configured to cover the open portion; and a spacer between the first current collector and the cap, the cap having a height corresponding to a distance between the first current collector and the cap.

Preferably, the spacer may be disposed at a center portion on a first surface of the first current collector.

In an aspect of the present disclosure, the first current collector may include a support portion at a center on a first surface of the electrode assembly; an uncoated region coupling portion extending from the support portion, the uncoated region coupling portion being coupled to the first uncoated region; and a housing contact portion extending from the support portion or an end of the uncoated region coupling portion, the housing contact portion being electrically coupled to the housing.

Preferably, the spacer may cover the support portion of the first current collector so as to prevent the support portion from being exposed beyond the spacer.

In particular, an outer diameter of an upper end of the spacer facing the first current collector may be equal to or larger than an outer diameter of the support portion.

In another aspect of the present disclosure, the spacer may cover at least a part of a weld portion connecting the uncoated region coupling portion of the first current collector and the first uncoated region.

Preferably, a radius of an upper end of the spacer facing the first current collector may be larger than a distance from the weld portion closest to the core of the electrode assembly to the core of the electrode assembly.

In another aspect of the present disclosure, the cap may include a venting portion having a smaller thickness than a surrounding region of the cap.

Preferably, the venting portion may be configured to rupture when an internal pressure of the housing increases above a predetermined level.

In particular, the venting portion may be a notching portion formed on at least one of two opposed surfaces of the cap.

In another aspect of the present disclosure, the venting portion may form a closed loop.

Preferably, the venting portion may be circular.

In another aspect of the present disclosure, the venting portion may be closer to a sidewall of the cap than a midpoint of a straight line connecting a center of the cap to the sidewall of the cap.

In another aspect of the present disclosure, the venting portion may extend along an edge of a flat area protruding downward from an edge area of the cap.

In another aspect of the present disclosure, the spacer may be located more inward toward the core than the venting portion so as not to cover the venting portion of the cap.

Preferably, a radius of a lower end of the spacer facing the cap may be smaller than a distance from a center of the cap to the venting portion.

In another aspect of the present disclosure, the spacer may include a spacer hole at a location corresponding to a winding center hole of the electrode assembly.

In another aspect of the present disclosure, the support portion may include a first current collector hole at a location corresponding to a winding center hole of the electrode assembly.

In another aspect of the present disclosure, the battery may further include a side cover covering at least a part of the outer circumferential surface of the electrode assembly, the side cover contacting an inner circumferential surface of the housing.

Preferably, the at least the part of the outer circumferential surface of the electrode assembly covered by the side cover extends along an outer circumference of the electrode assembly.

In particular, the side cover may have a thickness corresponding to a distance between the outer circumferential surface of the electrode assembly and the inner circumferential surface of the housing.

In another aspect of the present disclosure, the housing may include a beading portion formed by press-fitting around an outer circumferential surface the housing; and a crimping portion extended and bent such that an end defining the open portion surrounds an edge of the cap below the beading portion.

Preferably, the housing contact portion may contact a first surface of the beading portion facing the cap.

In another aspect of the present disclosure, the second electrode may include a second uncoated region in which the active material layer is not coated along the winding direction.

In another aspect of the present disclosure, the battery may further include a second current collector coupled to the second uncoated region; and an insulator disposed between a closed portion at an upper end of the housing and the second current collector.

Preferably, the insulator may have a height corresponding to a distance between the second current collector and the closed portion.

In another aspect of the present disclosure, the spacer may be made of an elastic material.

In another aspect of the present disclosure, a resistance measured between a positive electrode of the battery and a negative electrode of the battery may be 4 milliohm or less.

In another aspect of the present disclosure, a ratio of a form factor of the battery may be larger than 0.4, the ratio of the form factor of the battery being calculated by dividing a diameter of the battery by a height of the battery.

To solve the above-described problem, a battery pack according to an embodiment of the present disclosure includes a plurality of batteries according to an embodiment of the present disclosure as described above.

In an aspect of the present disclosure, each battery may further include a terminal opposite to the open portion, the terminal being electrically connected to the second electrode.

In another aspect of the present disclosure, the plurality of batteries may be arranged in a predetermined number of columns, and each terminal and an outer surface of a closed portion of the housing of each battery may be positioned upward.

In another aspect of the present disclosure, the battery pack may include a plurality of busbars to connect the plurality of batteries in series and in parallel, the plurality of busbars may be arranged above the plurality of batteries, and each busbar may include a body portion extending between the terminals of the adjacent batteries; a plurality of first busbar terminals extending from a side of the body portion, the first busbar terminals being electrically coupled to the terminals of the batteries arranged on the first side; and a plurality of second busbar terminals extending from a second side of the body portion opposite the second side, the second bus bar terminals being electrically coupled to the outer surfaces of the closed portions of the housings of the batteries arranged on the second side.

To solve the above-described problem, a vehicle according to an embodiment of the present disclosure includes the battery pack according to an embodiment of the present disclosure.

Advantageous Effects

According to an aspect of the present disclosure, it is possible to minimize the movement of the electrode assembly in the housing of the battery, thereby preventing damage from occurring to the electrical coupling part.

However, the effects that can be obtained through the present disclosure are not limited to the above-described effects, and other technical effects mentioned herein will be clearly understood by those skilled in the art from the following description.

BRIEF DESCRIPTION OF THE DRAWINGS

The accompanying drawings illustrate an exemplary embodiment of the present disclosure, and together with the following detailed description, serve to provide a further understanding of the technical aspects of the present disclosure, and thus the present disclosure should not be construed as being limited to the drawings.

DETAILED DESCRIPTION

Figure 1:
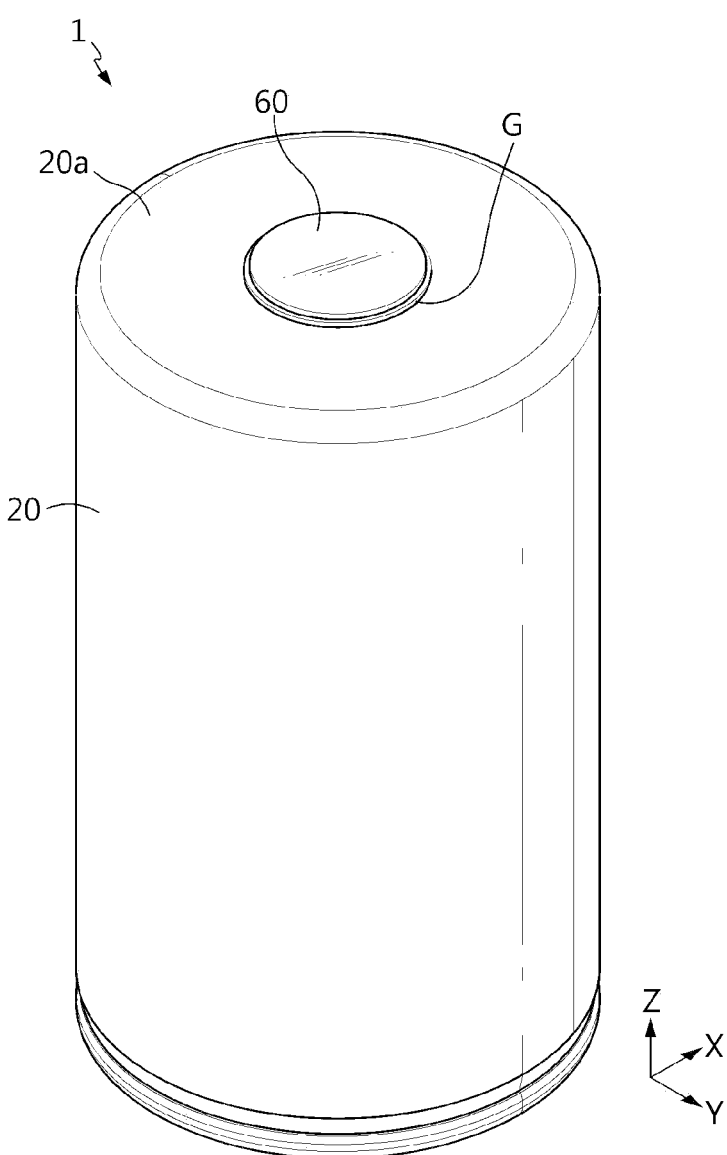
FIG. 1 is a perspective view showing an appearance of a battery according to an embodiment of the present disclosure.

Hereinafter, exemplary embodiments of the present disclosure will be described in detail with reference to the accompanying drawings. Prior to the description, it should be understood that the terms or words used in the specification and the appended claims should not be construed as being limited to general and dictionary meanings, but rather interpreted based on the meanings and concepts corresponding to the technical aspects of the present disclosure on the basis of the principle that the inventor is allowed to define the terms appropriately for the best explanation. Therefore, the embodiments described herein and illustrations shown in the drawings are just some of the exemplary embodiments of the present disclosure, but not intended to fully describe the technical aspects of the present disclosure, so it should be understood that a variety of other equivalents and modifications could have been made thereto at the time that the application was filed.

In addition, to help the understanding of the present disclosure, the accompanying drawings may illustrate some elements in exaggerated dimensions, not in actual scale. Furthermore, the same element in different embodiments may be given the same reference number.

When two elements are referred to as being equal, it represents that they are 'substantially equal'. Accordingly, substantially equal may encompass all cases having the deviation regarded as a low level in the corresponding technical field, for example, the deviation of 5% or less. In addition, uniformity of a certain parameter in a predetermined region may mean uniformity in terms of an average.

Although the terms first, second or the like are used to describe different elements, these elements are not limited by the terms. These terms are used to distinguish one element from another, and unless stated to the contrary, a first element may be a second element.

Throughout the specification, unless stated otherwise, each element may be singular or plural.

When an element is "above (or under)" or "on (or below)" another element, the element can be on an upper surface (or a lower surface) of the other element, and intervening elements may be present between the element and the other element on (or below) the element.

Additionally, when an element is referred to as being "connected", "coupled" or "linked" to another element, the element can be directly connected or coupled to the other element, but it should be understood that intervening elements may be present between each element, or each element may be "connected", "coupled" or "linked" to each other through another element.

Throughout the specification, "A and/or B" refers to either A or B or both unless expressly stated otherwise, and "C to D" refers to C or greater and D or smaller unless expressly stated otherwise.

Figure 2:
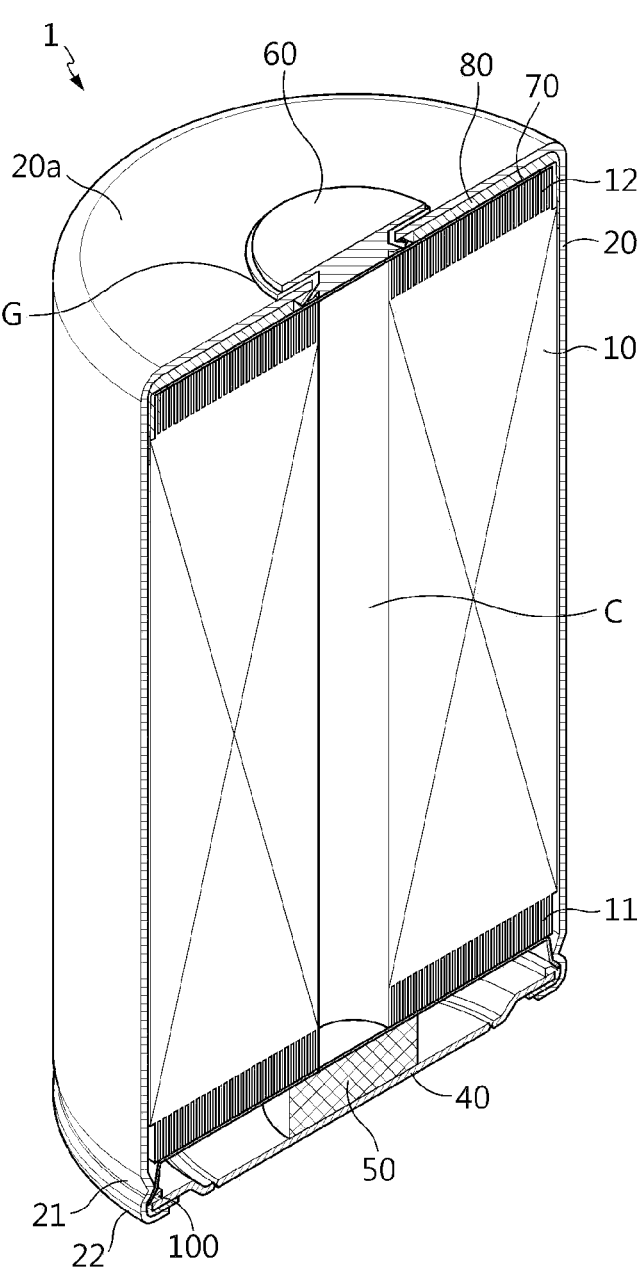
FIG. 2 is a cross-sectional view showing an internal structure of a battery according to an embodiment of the present disclosure.

Referring to FIGS. 1 and 2, a battery 1 according to an embodiment of the present disclosure may be, for example, a cylindrical battery. The battery 1 includes an electrode assembly 10, a housing 20, a first current collector 30, a cap 40 and a spacer 50.

In addition to the above-described elements, the battery 1 may further include an insulation gasket G and/or a terminal 60 and/or a second current collector 70 and/or an insulator 80 and/or a side cover 90 and/or a sealing gasket 100.

The present disclosure is not limited by the shape of the battery, and may be applied to batteries of other shapes, for example, prismatic batteries.

Referring to FIGS. 2, 4a, 7a and 8, the electrode assembly 10 includes a first uncoated region 11 and a second uncoated region 12. The electrode assembly 10 includes a first electrode having a first polarity, a second electrode having a second polarity and a separator interposed between the first electrode and the second electrode. The first electrode corresponds to a negative or positive electrode, and the second electrode corresponds to an electrode having the opposite polarity to the first electrode.

The electrode assembly 10 may have, for example, a jelly-roll shape. That is, the electrode assembly 10 may be manufactured by winding a stack formed by stacking a first separator, a first electrode, a second separator and a second electrode at least once in that order. The jelly-roll type electrode assembly 10 may have a winding center hole C at the center, the winding center hole C extended along the heightwise direction (parallel to the Z axis). The structure of the jelly-roll type electrode assembly 10 is known in the technical field of cylindrical batteries, and its detailed description is omitted. Meanwhile, an additional separator may be provided on the outer circumferential surface of the electrode assembly 10 for insulation from the housing 20.

The first electrode includes a first conductive substrate having a sheet shape and a first electrode active material layer formed by coating on one or two surfaces of the first conductive substrate. A first uncoated region 11 in which a first electrode active material is not coated exists at one end in the widthwise direction (parallel to the Z axis) of the first conductive substrate. The first electrode uncoated region is extended from one end to the other end along the lengthwise direction of the first electrode when viewing the first electrode in unfolded state. The first electrode uncoated region 11 itself may act as a first electrode tab. The first uncoated region 11 is on one surface of the electrode assembly 10. More specifically, the first uncoated region 11 is below the electrode assembly 10 accommodated in the housing 20 in the heightwise direction (parallel to the Z axis).

The second electrode includes a second conductive substrate having a sheet shape and a second electrode active material layer formed by coating on one or two surfaces of the second conductive substrate. An uncoated region in which a second electrode active material is not coated exists at the other end in the widthwise direction (parallel to the Z axis) of the second conductive substrate. The second electrode uncoated region 12 is extended from one end to the other end along the lengthwise direction of the second electrode when viewing the second electrode in unfolded state. The second electrode uncoated region 12 itself may act as a second electrode tab. The second uncoated region 12 is on the other surface of the electrode assembly 10. More specifically, the second uncoated region 12 is on the electrode assembly 10 accommodated in the housing 20 in the heightwise direction (parallel to the Z axis).

That is, the first uncoated region 11 and the second uncoated region 12 are extended and protruded in the opposite directions along the heightwise direction of the electrode assembly 10 (parallel to the Z axis), i.e., the heightwise direction of the battery 1 and is exposed beyond the separator.

Figure 8:
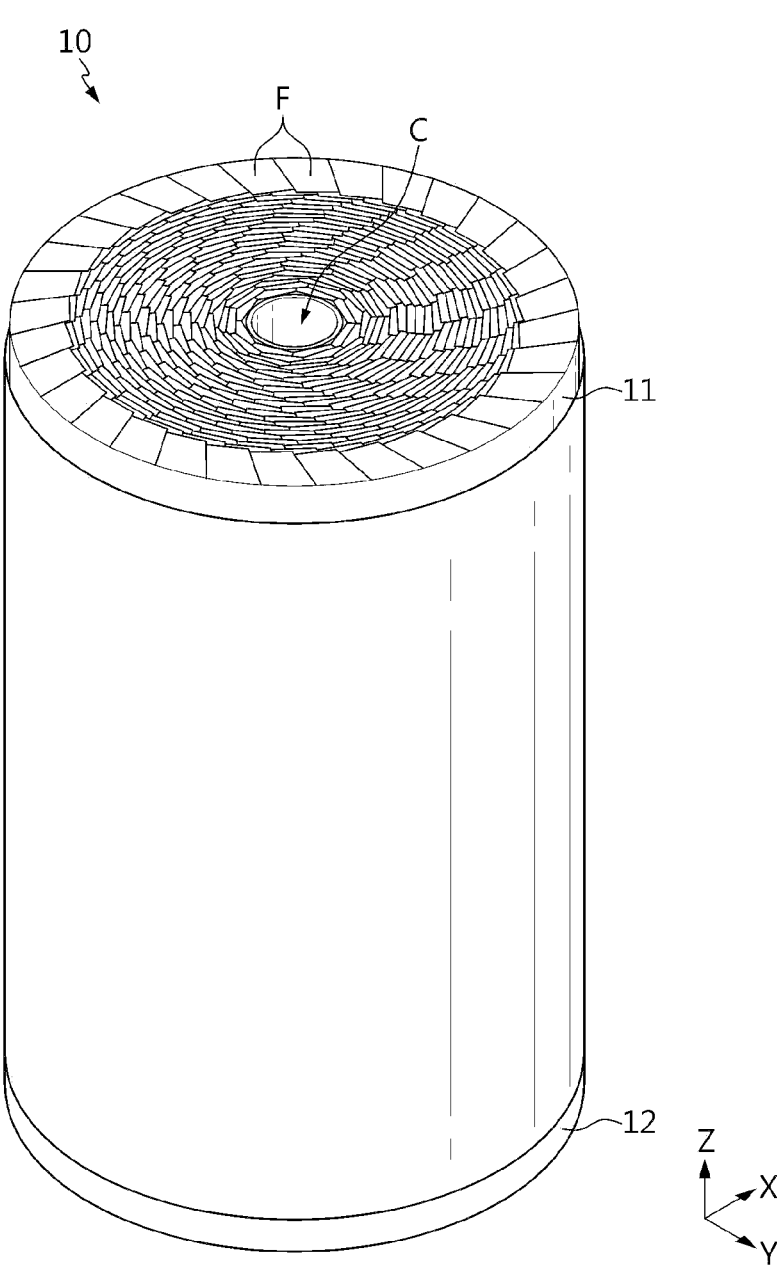
FIG. 8 is a diagram showing an electrode assembly having segments of the present disclosure.

Meanwhile, referring to FIG. 8, at least part of the first uncoated region 11 and/or the second uncoated region 12 may include a plurality of segments F split along the winding direction of the electrode assembly 10. In this case, the plurality of segments may be bent along the radial direction of the electrode assembly 10. The plurality of bent segments may overlap in multiple layers along the radial direction of the electrode assembly 10. In this case, the first current collector 30 and/or the second current collector 70 as described below may be coupled to an area in which the plurality of segments F overlaps in multiple layers. Meanwhile, the electrode assembly 10 may have a welding target area including a uniform number of overlaps of the segments F of the first uncoated region 11 along the radial direction of the electrode assembly 10. Since the number of overlapping layers is approximately at the maximum in the area, welding between the first current collector 30 and the first uncoated region 11 and/or welding between the second current collector 70 and the second uncoated region 12 as described below may be performed in the area. For example, in case that laser welding is applied, it is to prevent damage to the electrode assembly 10 due to the laser beam passing through the first uncoated region 11 and/or the second uncoated region 12 when increasing the output of the laser to improve the weld quality. Additionally, it is to effectively prevent the filtration of impurities, for example, weld spatter, into the electrode assembly 10.

In the present disclosure, the positive electrode active material coated on the positive electrode current collector and the negative electrode active material coated on the negative electrode current collector may include any active material known in the corresponding technical field pertaining to the present disclosure without limitations.

In an example, the positive electrode active material may include an alkali metal compound represented by formula $A[A_xM_y]O_{2+z}$ (A includes at least one of Li, Na or K; M includes at least one selected from Ni, Co, Mn, Ca, Mg, Al, Ti, Si, Fe, Mo, V, Zr, Zn, Cu, Al, Mo, Sc, Zr, Ru, and Cr; x≥0, 1≤x+y≤2, −0.1≤z≤2; the stoichiometric coefficients x, y and z are selected to keep the compound electrically neutral).

In another example, the positive electrode active material may be an alkali metal compound $xLiM^1O_2$—$(1-x)$ $Li_2M^2O_3$ ($M^1$ includes at least one element having an average trivalent oxidation state; $M^2$ includes at least one element having an average tetravalent oxidation state; 0≤x≤1) disclosed by U.S. Pat. Nos. 6,677,082 and 6,680,143.

In still another example, the positive electrode active material may be lithium metal phosphate represented by formula $Li_aM^1{}_xFe_{1-x}M^2{}_yP_{1-y}M^3{}_zO_{4-z}$ ($M^1$ includes at least one selected from Ti, Si, Mn, Co, Fe, V, Cr, Mo, Ni, Nd, Al, Mg and Al; $M^2$ includes at least one selected from Ti, Si, Mn, Co, Fe, V, Cr, Mo, Ni, Nd, Al, Mg, Al, As, Sb, Si, Ge, V and S; $M^3$ includes a halogen group element optionally containing F; 0<a≤2, 0≤x≤1, 0≤y<1, 0≤z<1; the stoichiometric coefficients a, x, y and z are selected to keep the compound electrically neutral), or $Li_3M_2(PO_4)_3$ [M includes at least one selected from Ti, Si, Mn, Fe, Co, V, Cr, Mo, Ni, Al, Mg and Al].

Preferably, the positive electrode active material may include primary particles and/or secondary particles formed by agglomeration of the primary particles.

In an example, the negative electrode active material may include a carbon material, a lithium metal or a lithium metal compound, silicon or a silicon compound, tin or a tin compound. Metal oxide having the potential of less than 2V such as $TiO_2$ and $SnO_2$ may be used for the negative electrode active material. The carbon material may include a low crystalline carbon and/or a high crystalline carbon.

For example, the separator may include a porous polymer film made of a polyolefin-based polymer such as an ethylene homopolymer, a propylene homopolymer, an ethylene/butene copolymer, an ethylene/hexene copolymer and an ethylene/methacrylate copolymer, used singly or a stack of them. In another example, the separator may include a common porous nonwoven fabric, for example, a nonwoven fabric made of high melting point glass fibers and polyethylene terephthalate fibers.

The separator may include a coating layer of inorganic particles on at least one surface. Additionally, the separator itself may be formed of a coating layer of inorganic particles. The particles that form the coating layer may be held together with a binder such that there is interstitial volume between adjacent particles.

The inorganic particles may include inorganic particles having the dielectric constant of 5 or more. Non-limiting examples of the inorganic particles may include at least one material selected from the group consisting of $Pb(Zr,Ti)O_3$ (PZT), $Pb_{1-x}La_xZr_{1-y}Ti_yO_3$ (PLZT), $PB(Mg_3Nb_{2/3})O_3$—$PbTiO_3$ (PMN-PT), $BaTiO_3$, hafnia ($HfO_2$), $SrTiO_3$, $TiO_2$, $Al_2O_3$, $ZrO_2$, $SnO_2$, $CeO_2$, MgO, CaO, ZnO and $Y_2O_3$.

An electrolyte may be a salt having a structure of $A^+B^-$. Here, $A^+$ includes an alkali metal cation such as $Li^+$, $Na^+$, $K^+$ or a combination thereof. $B^-$ includes at least one anion selected from the group consisting of $F^-$, $Cl^-$, $Br^-$, $I^-$, $NO_3^-$, $N(CN)_2^-$, $BF_4^-$, $ClO_4^-$, $AlO_4^-$, $AlCl_4^-$, $PF_6^-$, $SbF_6^-$, $AsF_6^-$, $BF_2C_2O_4^-$, $BC_4O_8^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $C_4F_9SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $(SF_5)_3C^-$, $(CF_3SO_2)_3C^-$, $CF_3(CF_2)_7SO_3^-$, $CF_3CO_2^-$, $CH_3CO_2^-$, $SCN^-$ and $(CF_3CF_2SO_2)_2N^-$.

The electrolyte may be used by dissolving in an organic solvent. The organic solvent may include at least one of propylene carbonate (PC), ethylene carbonate (EC), diethyl carbonate (DEC), dimethyl carbonate (DMC), dipropyl carbonate (DPC), dimethyl sulfoxide, acetonitrile, dimethoxyethane, diethoxyethane, tetrahydrofuran, N-methyl-2-pyrrolidone (NMP), ethyl methyl carbonate (EMC) or γ-butyrolactone.

Referring to FIGS. 1, 2, 4a and 7a, the housing 20 accommodates the electrode assembly 10 through an open portion at a lower end thereof. The housing 20 may be an approximately cylindrical container having the open portion on bottom and a closed portion on top. The housing 20 may be made of a material having conductive properties such as a metal. The material of the housing 20 may be a metal, for example, steel, stainless steel or aluminum. The side (an outer circumferential surface) and the upper surface of the housing 20 may be integrally formed. The upper surface (a surface parallel to the X-Y plane) of the housing 20 may have an approximately flat shape. The housing 20 accommodates the electrolyte together with the electrode assembly 10 through the open portion at a lower end thereof.

The housing 20 is electrically connected to the electrode assembly 10. The housing 20 is connected to the first uncoated region 11 of the electrode assembly 10. Accordingly, the housing 20 has electrically the same polarity as the first uncoated region 11.

Figure 4A:
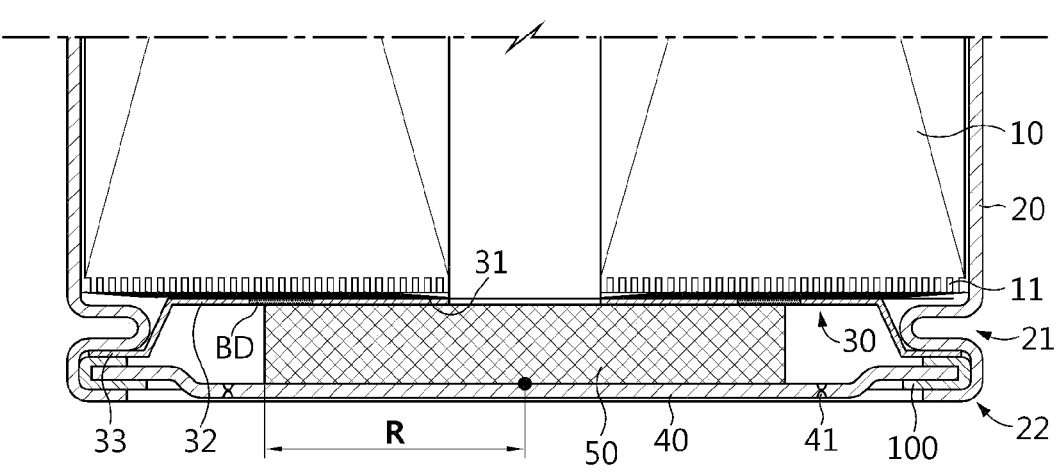
FIG. 4a is a partial cross-sectional view showing a region in which a spacer according to an embodiment of the present disclosure is applied.
Figure 4B:
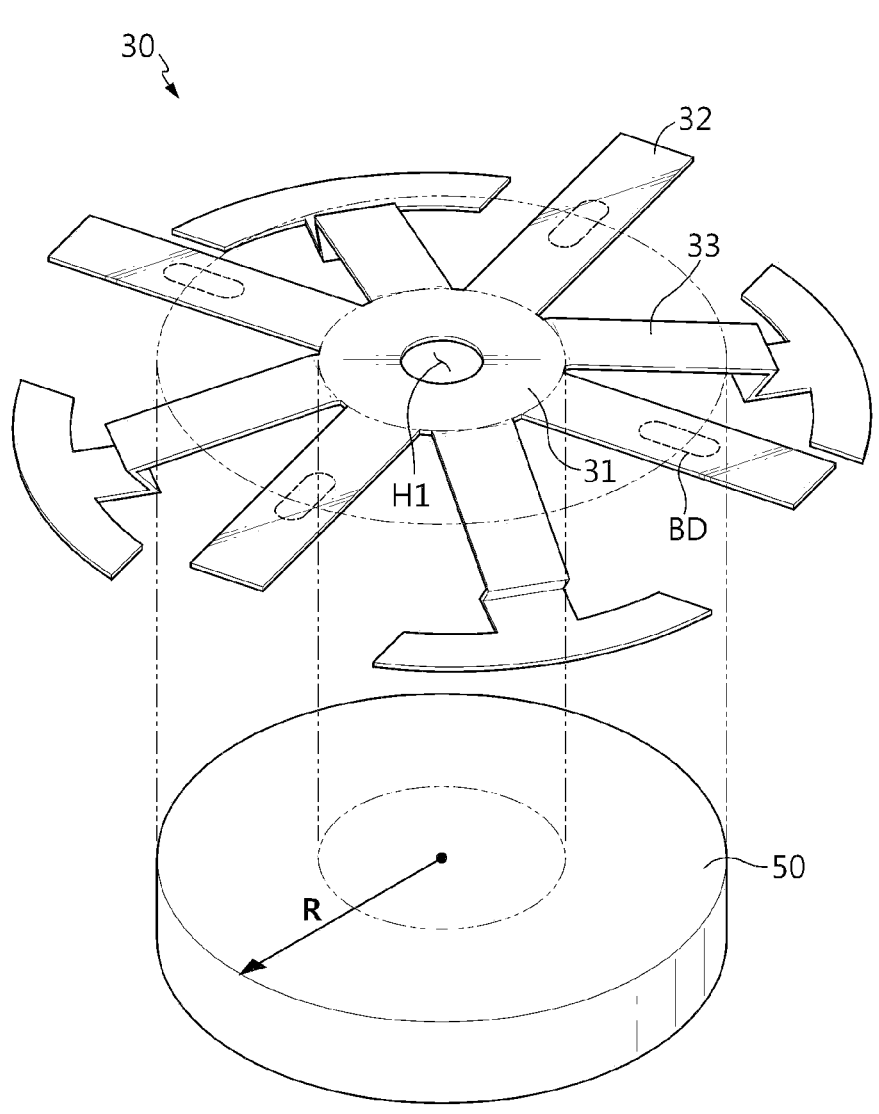
FIG. 4b is a diagram illustrating a positional relationship between a spacer and a first current collector of the present disclosure.
Figure 4C:
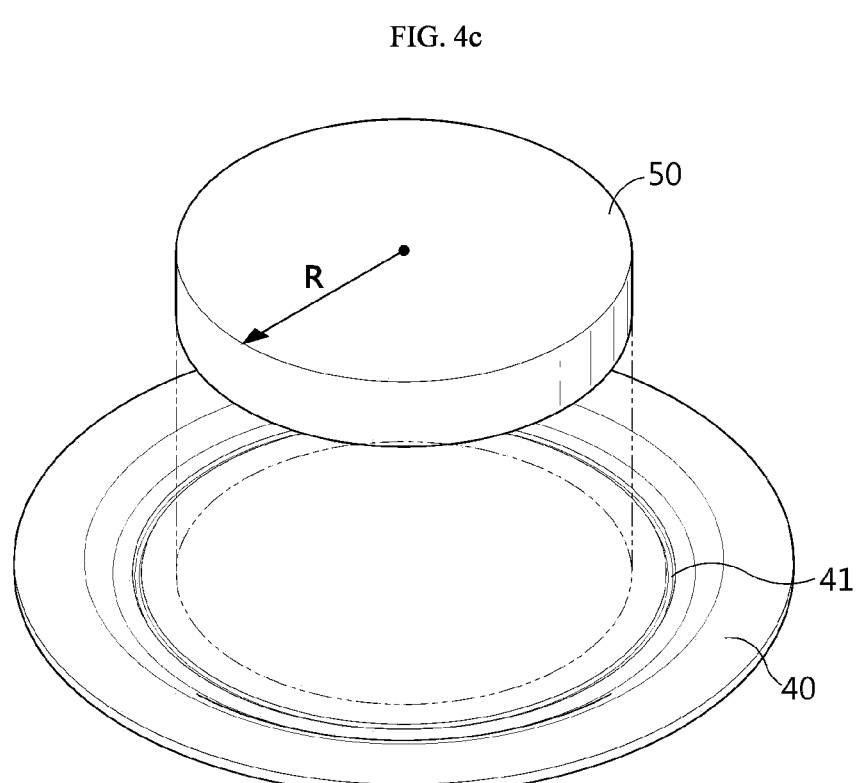
FIG. 4c is a diagram illustrating a positional relationship between a spacer and a venting portion of the present disclosure.

Referring to FIGS. 2 and 4a, the housing 20 may include a beading portion 21 and a crimping portion 22 at the lower end. The beading portion 21 is disposed below the electrode assembly 10 accommodated in the housing 20. The beading portion 21 is formed by press-fitting around the outer circumferential surface of the housing 20. The beading portion 21 may partially reduce the inner diameter of the housing 20 to prevent the electrode assembly 10 having a size approximately corresponding to the width of the housing 20 from exiting the open portion on bottom of the housing 20. The beading portion 21 may act as a support in which the cap 40 is seated.

The crimping portion 22 is below the beading portion 21. The crimping portion 22 may be directed toward the open portion compared to the beading portion 21, and may be extended toward the open portion and bent inward from the housing 20. The crimping portion 22 is extended and bent to surround the outer circumferential surface of the cap 40 below the beading portion 21 and at least part of the lower surface of the cap 40.

Referring to FIGS. 2 to 4a, the first current collector 30 may be coupled to the first uncoated region 11 of the electrode assembly 10 and disposed within the housing 20. The first current collector 30 covers at least part of one bottom surface of the electrode assembly 10. The assembly including the electrode assembly 10 and the first current collector 30 may be inserted into the housing 20 through the opening on bottom of the housing 20. The first current collector 30 is electrically connected to the housing 20. That is, the first current collector 30 may act as a medium for electrical connection between the electrode assembly 10 and the housing 20.

Figure 3:
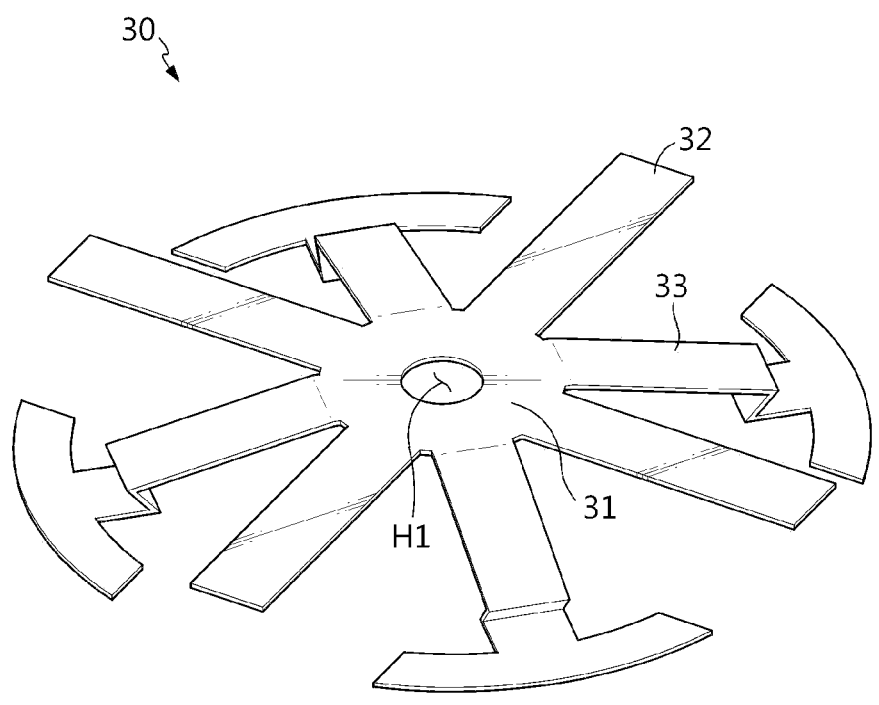
FIG. 3 is a perspective view showing an exemplary shape of a first current collector applied to the present disclosure.

Referring to FIG. 3, the first current collector 30 may include, for example, a support portion 31, an uncoated region coupling portion 32 and a housing contact portion 33.

The support portion 31 is approximately at the center on one surface on the bottom of the electrode assembly 10. The support portion 31 may have a first current collector hole H1. In this case, the first current collector hole H1 may be at a location corresponding to the winding center hole C of the electrode assembly 10. The first current collector hole H1 may act as a passage for insertion of a welding rod or laser radiation for coupling between the terminal 60 and the second current collector 70 as described below. Besides, the first current collector hole H1 may act as a passage for smooth permeation of the electrolyte solution into the electrode assembly 10 when injecting the electrolyte solution.

In an aspect of the present disclosure, the uncoated region coupling portion 32 is extended from the support portion 31 and coupled to the first uncoated region 11. In particular, the uncoated region coupling portion 32 may be coupled to the first uncoated region 11 by welding. The welding method may include, for example, laser welding, resistance welding and ultrasonic welding, but is not limited thereto. The uncoated region coupling portion 32 may be coupled to the first uncoated region 11 by welding in parallel to the upper surface of the battery housing 20. The first uncoated region 11 and the uncoated region coupling portion 32 may be coupled by welding along the radial direction of the electrode assembly 10.

In an embodiment, welding may be performed at a predetermined area when the uncoated region coupling portion 32 is seated at the end of the first uncoated region 11. In another embodiment, as shown in FIG. 8, at least part of the first uncoated region 11 may include the plurality of segments F along the winding direction of the electrode assembly 10. The plurality of segments F may be bent along the radial direction of the electrode assembly 10 to form a bend surface. The radial direction of the electrode assembly refers to a direction toward the core or the outer circumference. For example, the plurality of segments F may be bent toward the core of the electrode assembly 10. The plurality of segments F may overlap in multiple layers along the radial direction of the electrode assembly 10. The bend surface may include an increasing stack number zone in which the number of overlapping layers of the segments F gradually increases up to the maximum number from the outer circumference of the electrode assembly 10 to the core and a uniform stack number zone from a radial location at which the number of overlapping layers is at the maximum to a radial location at which the innermost segment is disposed.

In this case, when the uncoated region coupling portion 32 is seated on the bend surface of the first uncoated region 11, welding may be performed at the predetermined area. That is, the uncoated region coupling portion 32 may be coupled to the region in which the plurality of segments F overlaps in multiple layers. For example, the uncoated region coupling portion 32 may be coupled to the bend surface such that it overlaps the uniform stack number zone. For example, the welding between the uncoated region coupling portion 32 and the first uncoated region 11 may be performed in the region including 10 or more overlapping layers of the first uncoated region 11 on the bend surface of the first uncoated region 11. A ratio of the radius of the region including 10 or more overlapping layers to the radius of the electrode assembly except the core may be equal to or larger than 25% by adjusting the length of the first uncoated region 11.

In another aspect of the present disclosure, a welding bead may be formed in a weld area between the first uncoated region 11 and the uncoated region coupling portion 32. The welding bead refers to an approximately circular weld portion formed when spot welding is performed at a specific spot. A specific welding pattern may be formed by connecting a plurality of welding beads. For example, referring to FIGS. 4a and 4b, the weld portion BD of an approximately straight line shape may be formed by the plurality of welding beads. In an embodiment, the weld portion BD between the first uncoated region 11 and the uncoated region coupling portion 32 may form the welding pattern extended along the radial direction of the electrode assembly 10. More preferably, the weld portion BD between the first uncoated region 11 and the uncoated region coupling portion 32 may form the welding pattern of a straight line shape extended along the radial direction of the electrode assembly 10.

In still another aspect of the present disclosure, for example, a plurality of uncoated region coupling portions 32 may be provided. In this case, each of the plurality of uncoated region coupling portions 32 may be extended radially from the support portion 31. The uncoated region coupling portion 32 may have a strip shape. In a variation, the side of the uncoated region coupling portion 32 may be modified into a round shape.

The housing contact portion 33 may be extended from the support portion 31 as shown in FIG. 3, or as opposed to that of FIG. 3, the housing contact portion 33 may be extended from the end of the uncoated region coupling portion 32. Accordingly, the housing contact portion 33 may be electrically coupled to the housing 20. Specifically, the end of the housing contact portion 33 may be interposed between the sealing gasket 100 and the housing 20 as described below and come into contact with the housing 20 to make an electrical connection between the housing 20 and the first current collector 30. For example, the end of the housing contact portion 33 may contact one surface of the beading portion 21 facing the cap 40.

Further, the housing contact portion 33 may be compressed and fixed by the crimping portion 22. For example, referring to FIG. 4a, the housing contact portion 33 of the first current collector 30 may be placed on the lower surface of the beading portion 21. The cap 40 with the end surrounded by the sealing gasket 100 may be placed on the lower surface of the housing contact portion 33. Subsequently, the housing 20 is bent, surrounding the edge of the cap 40, in order to fix the cap 40 and the first current collector 30. The cap 40 and the first current collector 30 are fixed on the beading portion 21 by the shape of the bent crimping portion 22.

Even further, a weld portion may be formed between the beading portion 21 of the housing 20 and the housing contact portion 33 of the first current collector 30. For example, the housing contact portion 33 may not be firmly fixed only by a crimping force. Moreover, when the sealing gasket 100 shrinks by heat or the crimping portion 22 deforms by external impacts, the coupling strength between the first current collector 30 and the housing 20 may reduce. Accordingly, when the housing contact portion 33 is placed on the beading portion 21 of the housing 20, the first current collector 30 may be fixed to the housing 20 through welding. In this instance, the housing contact portion 33 may be coupled to the beading portion 21 on the inner surface of the housing 20. As shown in FIG. 4a, the lower surface of the beading portion 21 may be extended along a direction approximately parallel to the upper surface of the housing 20, i.e., a direction approximately perpendicular to the sidewall of the housing 20 and the housing contact portion 33 may be also extended along the same direction, to bring the housing contact portion 33 into stable contact with the beading portion 21. Additionally, as the housing contact portion 33 stably contacts the beading portion 21, it is possible to smoothly weld the two components, thereby improving the coupling strength between the two components and minimizing the resistance increase at the coupling part.

Additionally, by the structure in which the first current collector 30 is coupled to the beading portion 21 of the housing 20, not the inner surface of the cylinder of the housing 20, the distance between the first current collector 30 and the beading portion 21 may be reduced. Accordingly, it is possible to minimize a dead space in the housing 20, thereby improving the energy density of the battery 1.

In another aspect of the present disclosure, the weld portion between the beading portion 21 and the housing contact portion 33 may form a welding pattern of a straight line shape extended along the circumferential direction. Alternatively, the weld portion between the beading portion 21 and the housing contact portion 33 may form a welding pattern of an arc shape extended along the circumferential direction.

In still another aspect of the present disclosure, for example, there may be a plurality of housing contact portions 33. In this case, the plurality of housing contact portions 33 may be extended radially from the support portion 31 as shown in FIG. 3, and at least one housing contact portion 33 may be between the adjacent uncoated region coupling portions 32. Alternatively, as opposed to that of FIG. 3, each of the plurality of housing contact portions 33 may be extended from the end of each of the plurality of uncoated region coupling portions 32.

Figure 6:
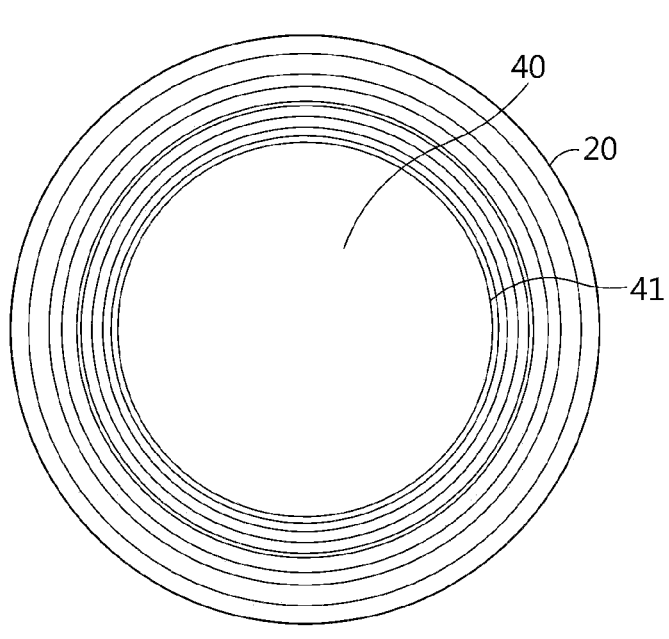
FIG. 6 is a bottom view of a battery of the present disclosure.

Referring to FIGS. 2, 4a and 6, the cap 40 covers the open portion of the housing 20. For example, the cap 40 may be made of a metal to ensure stiffness. The cap 40 forms the lower surface of the battery 1. In the battery 1 of the present disclosure, the cap 40 may not have polarity even when the cap 40 is made of a metal having conductive properties. Having no polarity may represent that the cap 40 is electrically insulated from the housing 20 and the terminal 60. Accordingly, the cap 40 does not act as a positive electrode terminal or a negative electrode terminal. Accordingly, the cap 40 does not need to be electrically connected to the electrode assembly 10 and the housing 20, and the cap 40 is not necessarily made of a conductive metal.

When the housing 20 of the present disclosure includes the beading portion 21, the cap 40 may be seated on the beading portion 21 of the housing 20. Additionally, when the housing 20 of the present disclosure includes the crimping portion 22, the cap 40 is fixed by the crimping portion 22. The sealing gasket 100 is between the cap 40 and the crimping portion 22 of the housing 20 to ensure sealability of the housing 20.

Referring to FIGS. 4a and 6, the cap 40 may further include a venting portion 41 to prevent the internal pressure from rising above a preset value due to gas generated in the housing 20. The venting portion 41 corresponds to an area having a smaller thickness than the other areas in the cap 40. The venting portion 41 is structurally weaker than any other area. Accordingly, when the internal pressure of the housing 20 rises above the predetermined level due to a fault or failure in the battery 1, the venting portion 41 ruptures to force gas generated in the housing 20 out. For example, the venting portion 41 may be formed by notching any one or two surfaces of the cap 40 to partially reduce the thickness of the housing 20. That is, the venting portion 41 may be a notching portion in at least one of the two surfaces of the cap 40.

As shown in FIG. 4a, the lower end of the cap 40 is preferably disposed higher than the lower end of the housing 20. By this structure, even when the lower end of the housing 20 contacts the ground or the bottom of the housing for forming a module or a pack, the cap 40 does not contact the ground or the bottom of the housing. Accordingly, it is possible to prevent a phenomenon in which the pressure required for the rupture of the venting portion 41 is different from the design pressure due to the weight of the battery 1, thereby allowing for smooth rupture of the venting portion 41.

Meanwhile, the venting portion 41 may have a closed loop shape as shown in FIG. 6. Preferably, the venting portion 41 may be circular. In this instance, in particular, the venting portion 41 may rupture more easily as the distance from the center of the cap 40 to the venting portion 41 is larger. When the same venting pressure is applied, as the distance from the center of the cap 40 to the venting portion 41 is longer, a force acting on the venting portion 41 is larger, which makes rupture easier. Additionally, it is possible to force venting gas out more smoothly as the distance from the center of the cap 40 to the venting portion 41 is longer. For example, the venting portion 41 may be closer to the end than the midpoint of a straight line connecting the center of the cap 40 to the end of the cap 40. From this perspective, the venting portion 41 may be formed along the edge of the approximately flat region protruding downward (a downward direction on the basis of FIG. 4a) from the edge area of the cap 40.

Although FIG. 6 of the present disclosure shows the venting portion 41 continuously formed in an approximately circular shape, the present disclosure is not limited thereto. The venting portion 41 may be discontinuously formed in an approximately circular shape on the cap 40, and may be formed in the shape of an approximately straight line or other shapes.

Figure 5:
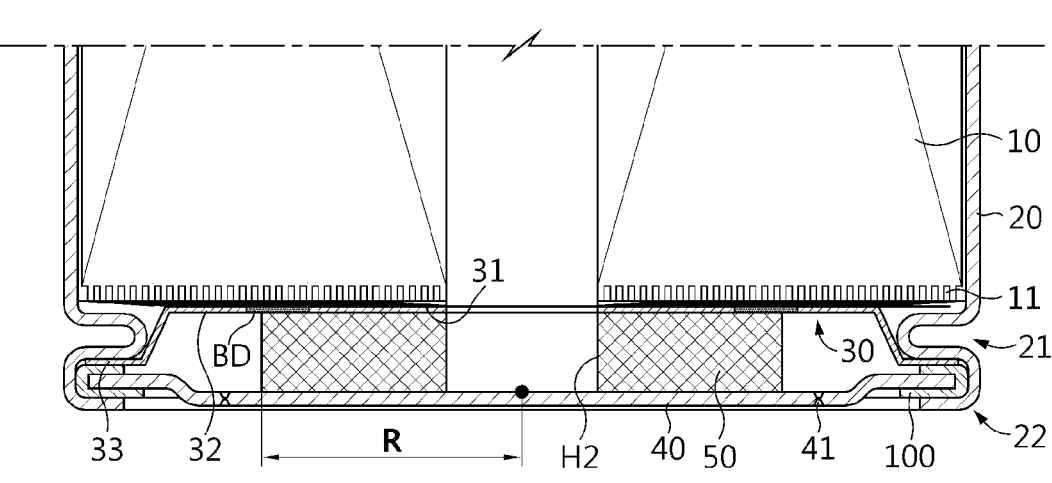
FIG. 5 is a partial cross-sectional view showing a region to which a spacer according to another embodiment of the present disclosure is applied.

Referring to FIGS. 2, 4a and 5, the spacer 50 is configured to prevent the movement of the electrode assembly 10. That is, the spacer 50 is between the cap 40 and the electrode assembly 10 to fix the electrode assembly 10. More specifically, the spacer 50 may fix the vertical position of the electrode assembly 10.

In an aspect of the present disclosure, the upper surface of the spacer 50 may contact the lower surface of the first current collector 30, and the lower surface of the spacer 50 may contact the inner surface of the cap 40. That is, the spacer 50 is between the first current collector 30 and the cap 40. The spacer 50 may have a height corresponding to the distance between the first current collector 30 and the cap 40. In this case, the spacer 50 may effectively prevent the electrode assembly 10 from moving in the housing 20 due to the gap formed between the first current collector 30 and the cap 40. For example, the spacer 50 may fill at least part of the space between the first current collector 30 and the cap 40, thereby preventing the electrode assembly 10 from vibrating up and down when the battery 1 vibrates up and down. Accordingly, it is possible to prevent the first uncoated region 11 and/or the second uncoated region 12 from unnecessarily bending or stretching. Accordingly, the spacer 50 may prevent damage from occurring to the coupling part between the electrode assembly 10 and the first current collector 30 and/or the coupling part between the first current collector 30 and the housing 20. Finally, the spacer 50 may prevent an internal short circuit of the battery 1.

In another aspect of the present disclosure, the spacer 50 may be disposed at approximately the center on one surface on the bottom of the electrode assembly 10.

FIG. 5 is a partial cross-sectional view showing the region to which the spacer according to another embodiment of the present disclosure is applied. Referring to FIG. 5, the spacer 50 may have a spacer hole H2 at the location corresponding to the winding center hole C of the electrode assembly 10. In the same way as the above-described first current collector hole H1, the spacer hole H2 may act as an insertion passage of a welding rod or a passage for laser radiation. In this instance, the winding center hole C of the electrode assembly 10, the first current collector hole H1 and the spacer hole H2 may be on the same straight line. By this structure, in the same way as the above-described first current collector hole H1, the spacer hole H2 may act as a passage for good wetting of the electrolyte solution to the electrode assembly 10 when injecting the electrolyte solution.

In an aspect of the present disclosure, the spacer 50 may cover the support portion 31 of the first current collector 30 to prevent the support portion 31 from being exposed beyond the spacer 50. For example, referring to FIGS. 4a and 4b, the outer diameter of the upper end of the spacer 50 facing the first current collector 30 may be approximately equal to or larger than the outer diameter of the support portion 31. In this case, the spacer 50 may effectively press down the first current collector 30.

In another aspect of the present disclosure, the spacer 50 may be configured to cover at least part of the weld portion BD formed by welding between the uncoated region coupling portion 32 of the first current collector 30 and the first uncoated region 11. For example, referring to FIGS. 4a and 4b, the radius R of the upper end of the spacer 50 facing the first current collector 30 may be larger than the distance from the weld portion BD closest to the core of the electrode assembly 10 to the core of the electrode assembly 10. The radial width of the region in which the spacer 50 and the weld portion BD overlap may be at least 5%, preferably at least 10%, and more preferably at least 20% of the total radial width of the weld portion BD. In this case, for example, the spacer 50 may effectively prevent damage to the welded part of the first current collector 30 and the first uncoated region 11 in a crimping process or a sizing process.

In another aspect of the present disclosure, the spacer 50 may be disposed at the inner position toward the core than the venting portion 41 not to cover the venting portion 41 of the cap 40. For example, referring to FIGS. 4a and 4c, the radius R of the lower end the spacer 50 facing the cap 40 may be smaller than the distance from the center of the cap 40 to the venting portion 41. This is to prevent a phenomenon in which the rupture pressure of the venting portion 41 is different from the design value due to the spacer 50 covering the venting portion 41.

In another aspect of the present disclosure, the spacer 50 may have an approximately cylindrical shape. For example, in the cross-sectional view of FIG. 2, it can be seen that the spacer 50 is a half-cylindrical shape. However, the shape of the spacer 50 is not limited thereto. For example, the spacer 50 may have a polygonal prism shape. In this case, the distance from the center of the spacer 50 to the vortex of the polygon of the spacer 50 may be approximately equal to or larger than the radius of the support portion 31. In another aspect, the distance from the center of the spacer 50 to the vortex of the polygon of the spacer 50 may be larger than the distance from the weld portion closest to the core of the electrode assembly 10 to the core of the electrode assembly 10. In still another aspect, the distance from the center of the spacer 50 to the vortex of the polygon of the spacer 50 may be smaller than the distance from the center of the cap 40 to the venting portion 41.

Alternatively, the spacer 50 may have a pillar shape having a uniform height and a closed curve in horizontal cross section. In this case, the distance of the spacer to the farthest point from the center may be approximately equal to or larger than the radius of the support portion 31. In another aspect, the distance of the spacer to the farthest point from the center may be larger than the distance from the weld portion closest to the core of the electrode assembly 10 to the core of the electrode assembly 10. In still another aspect, the distance of the spacer to the farthest point from the center may be smaller than the distance from the center of the cap 40 to the venting portion 41.

Meanwhile, the spacer 50 may be made of a material having elastic properties. For example the spacer 50 may include an insulating polymer material. Accordingly, when vibrations and external impacts are applied to the battery 1, the spacer 50 may absorb the impacts while returning to the original state by the elastic properties after compressed. Accordingly, it is possible to minimize damage to the internal components of the battery 1 when vibrations and external impacts are applied to the battery 1.

Figure 7A:
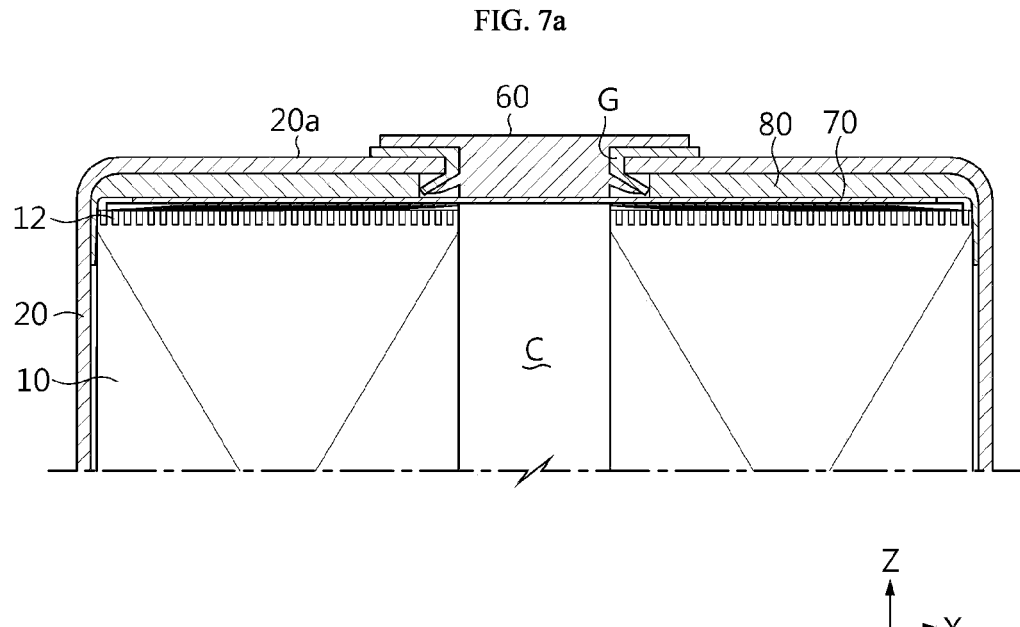
FIG. 7a is a partial cross-sectional view showing a region in which an insulator of the present disclosure is applied.

Referring to FIGS. 1, 2 and 7a, the terminal 60 is electrically connected to the second uncoated region 12 of the electrode assembly 10. The terminal 60 may be disposed opposite the open portion of the housing 20 and electrically connected to the second electrode. Specifically, for example, the terminal 60 may pass through approximately the center of the closed portion on top of the housing 20. Parts of the terminal 60 may be exposed beyond the top of the housing 20, and the others may be disposed within the housing 20. For example, the terminal 60 may be fixed to the inner surface of the closed portion of the housing 20 by riveting. That is, the edge may be bent and riveted to the inner surface of the closed portion of the housing 20 by plastic deformation of the lower edge of the terminal 60 using a caulking jig.

As described above, in the present disclosure, as the housing 20 is electrically connected to the first uncoated region 11 of the electrode assembly 10, the closed portion on top of the housing 20 may act as a first electrode terminal 20a having the first polarity. By contrast, as the terminal 60 is electrically connected to the second uncoated region 12 of the electrode assembly 10, the terminal 60 exposed beyond the housing 20 may act as a second electrode terminal.

That is, the battery 1 of the present disclosure has a structure in which the pair of electrode terminals 60, 20a are in the same direction. Accordingly, it is possible to place an electrical connection component such as a bus bar on only one side of the battery 1 when electrically connecting the plurality of batteries 1. This may lead to a simple battery pack structure and improved energy density. Additionally, since the battery 1 has a structure in which one surface of the housing 20 having an approximately flat shape may be used as the first electrode terminal 20a, it is possible to ensure a sufficient bond area in the bonding of the electrical connection component such as a bus bar to the first electrode terminal 20a. Accordingly, the battery 1 may have sufficient bond strength between the electrical connection component and the first electrode terminal 20a and reduce the resistance at the bond part to a desirable level.

As described above, when the terminal 60 acts as the second electrode terminal, the terminal 60 is electrically isolated from the housing 20 having the first polarity. The electrical insulation between the housing 20 and the terminal 60 may be achieved by various methods. For example, insulation may be achieved by interposing the insulation gasket G between the terminal 60 and the housing 20. Alternatively, insulation may be achieved by forming an insulating coating layer in a part of the terminal 60. Alternatively, the terminal 60 and the housing 20 may be spaced apart from each other to prevent them from contacting each other, and the terminal 60 may be structurally firmly fixed. Alternatively, two or more of the above-described methods may be applied together.

Meanwhile, when the insulation gasket G is applied for electrical insulation and riveting is applied to fix the terminal 60, the insulation gasket G may be bent toward the inner surface of the closed portion on top of the housing 20 as the insulation gasket G is compressed and deformed together with the terminal 60 during the riveting of the terminal 60. When the insulation gasket G is made of a resin material, the insulation gasket G may be coupled to the housing 20 and the terminal 60 by heat fusion. In this case, it is possible to enhance sealability at the coupling interface between the insulation gasket G and the terminal 60 and the coupling interface between the insulation gasket G and the housing 20.

Referring to FIGS. 2 and 7a, the second current collector 70 is coupled to the top of the electrode assembly 10. The second current collector 70 is made of a metal having conductive properties and coupled to the second uncoated region 12. For example, the coupling between the second uncoated region 12 and the second current collector 70 may be accomplished by laser welding.

Referring to FIGS. 2 and 7a, the insulator 80 is between the closed portion on top of the housing 20 and the top of the electrode assembly 10 or between the closed portion and the second current collector 70. The insulator 80 may be made of, for example, a resin material having insulating properties. The insulator 80 prevents the contact between the electrode assembly 10 and the housing 20 and/or the contact between the electrode assembly 10 and the second current collector 70.

Additionally, the insulator 80 may be between the top of the outer circumferential surface of the electrode assembly 10 and the inner surface of the housing 20. In this case, it is possible to prevent a short from occurring due to the contact between the second uncoated region 12 of the electrode assembly 10 and the inner surface of the sidewall of the housing 20.

The insulator 80 may have a height corresponding to the distance between the closed portion on top of the housing 20 and the electrode assembly 10 or the distance between the closed portion and the second current collector 70. In this case, it is possible to prevent the electrode assembly 10 from moving in the housing 20, thereby significantly reducing the likelihood that the coupling part for electrical connection between components may be damaged. When the insulator 80 is applied together with the spacer 50, it is possible to maximize the prevention effect of the movement of the electrode assembly 10.

In an aspect of the present disclosure, the insulator 80 may be made of a material having elastic properties. For example, the insulator 80 may include an insulating polymer material. Accordingly, when vibrations and external impacts are applied to the battery 1, the insulator 80 may absorb the impacts while returning to the original state by the elastic properties after compressed. Accordingly, it is possible to minimize damage to the internal components of the battery 1 when vibrations and external impacts are applied to the battery 1.

In another aspect of the present disclosure, the insulator 80 may have an opening at the location corresponding to the winding center hole C of the electrode assembly 10. Through the opening, the cell terminal 60 may directly contact the second current collector 70.

Further, the bottom surface of the terminal 60 in contact with the top surface of the second current collector 70 may be coupled to the second current collector 70 by welding. In particular, the terminal 60 may be coupled to the center of the second current collector 70 by welding. For example, referring to FIG. 7b, the welding between the terminal 60 and the second current collector 70 may be performed by a welding rod inserted through the winding center hole C1 and the first current collector hole H1 or a laser welding beam. The welding method may include, for example, laser welding, resistance welding and ultrasonic welding, but is not limited thereto.

Figure 7B:
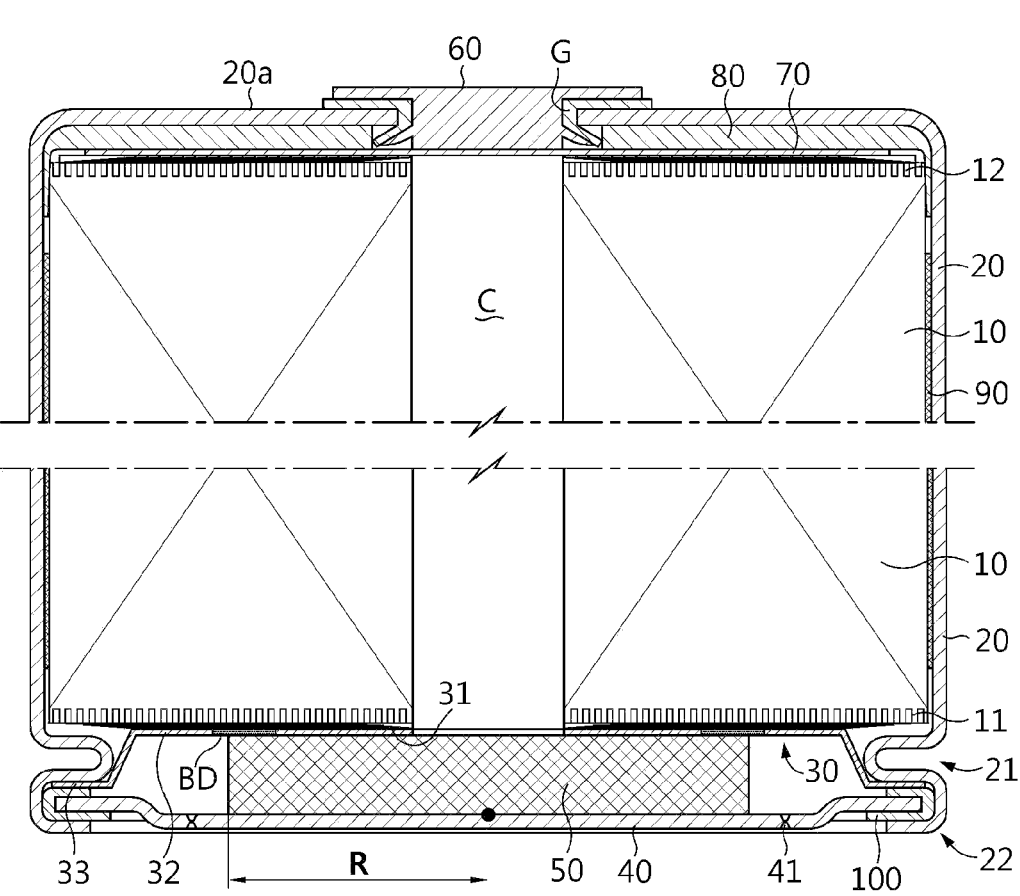
FIG. 7b is a cross-sectional view showing a region to which a side cover of the present disclosure is applied.

Referring to FIG. 7b, the battery 1 according to an embodiment of the present disclosure may further include a side cover 90. The side cover 90 may cover at least part of the outer circumferential surface of the electrode assembly 10. The side cover 90 may contact at least part of the housing 20. For example, the side cover 90 may contact the inner circumferential surface of the housing 20. Preferably, the side cover 90 may cover at least part of the outer circumferential surface of the electrode assembly 10 along the outer circumference of the electrode assembly 10. That is, the side cover 90 may be between the outer circumferential surface of the electrode assembly 10 and the inner circumferential surface of the housing 20. In this instance, the side cover 90 may have a thickness corresponding to the distance between the outer circumferential surface of the electrode assembly 10 and the inner circumferential surface of the housing 20. For example, describing with reference to FIG. 7*b*, the thickness of the side cover 90 is approximately equal to the distance between the outer circumferential surface of the electrode assembly 10 and the inner circumferential surface of the housing 20.

By this structural feature of the side cover 90, it is possible to fill up the space between the outer circumferential surface of the electrode assembly 10 and the inner circumferential surface of the housing 20. Accordingly, when vibrations and external impacts are applied to the battery 1, it is possible to minimize the movement of the electrode assembly 10 in the housing 20, thereby preventing damage at the electrical coupling part. That is, the side cover 90 may improve the vibration resistance of the battery 1 to horizontal vibrations.

Meanwhile, in another aspect of the present disclosure, although not shown in the drawings, the side cover 90 may have its end in contact with the bent end of the insulator 80. Further, the side cover 90 may be integrally formed with the bent end of the insulator 80. That is, the side cover 90 may be connected to and integrally formed with the insulator 80. By this structure, it is possible to further reduce the empty space between the outer circumferential surface of the electrode assembly 10 and the inner circumferential surface of the housing 20, thereby further improving the vibration resistance.

Meanwhile, the side cover 90 may be made of a material having elastic properties. For example, the side cover 90 may include an insulating polymer material. Accordingly, when vibrations and external impacts are applied to the battery 1, the side cover 90 may absorb the impacts while returning to the original state by the elastic properties after compressed. Accordingly, it is possible to minimize damage to the internal components of the battery 1 when vibrations and external impacts are applied to the battery 1.

Referring to FIGS. 4*a* and 5, the sealing gasket 100 may be between the housing 20 and the cap 40 to ensure sealability between the housing 20 and the cap 40. Specifically, the sealing gasket 100 may have approximately a ring shape around the cap 40. The sealing gasket 100 may cover the lower surface, the upper surface and the side of the cap 40 at the same time. The radial length of a region of the sealing gasket 100 that covers the upper surface of the cap 40 may be equal to or smaller than the radial length of a region of the sealing gasket 100 that covers the lower surface of the cap 40. When the radial length of the region of the sealing gasket 100 that covers the upper surface of the cap 40 is too long, the first current collector 30 or the housing 20 may be damaged due to the pressure applied to the first current collector 30 by the sealing gasket 100 in the sizing process in which the housing 20 is vertically compressed. Accordingly, the radial length of the region of the sealing gasket 100 that covers the upper surface of the cap 40 is preferably small at a predetermined level.

The battery 1 of the present disclosure described above has a structure in which the resistance is minimized through the increased weld area through the bend surface, current path diversity using the first current collector 30 and the minimized current path length. The AC resistance of the battery 1 measured through a resistance meter between the positive electrode and the negative electrode and between the terminal 60 and the surrounding flat outer surface 20*a* may be approximately 0.5 milliohm to 4 milliohm, and preferably approximately 1 milliohm to 4 milliohm, suitable for fast charging.

Preferably, the battery may have a ratio of form factor (a value obtained by dividing the diameter of the battery by its height, i.e., defined as a ratio of diameter Φ to height H) larger than approximately 0.4. Here, the form factor refers to a value indicating the diameter and height of the battery.

Preferably, the battery may be approximately 40 mm to 50 mm in diameter, and approximately 60 mm to 130 mm in height. The battery according to an embodiment of the present disclosure may be, for example, 46110 battery, 4875 battery, 48110 battery, 4880 battery, 4680 battery. In the numbers indicating the form factor, the former two numbers indicate the diameter of the battery, and the remaining numbers indicate the height of the battery.

In case that the electrode assembly having a tab-less structure is applied to the battery having the ratio of form factor of more than 0.4, stress applied in the radial direction when bending the uncoated region is so large to cause the uncoated region to tear. Additionally, to ensure the sufficient weld strength and reduce the resistance when welding the current collector to the bent surface area of the uncoated region, it is necessary to sufficiently increase the number of stacks of the uncoated region at the bent surface area. These requirements may be achieved by the electrode and the electrode assembly according to the embodiments (variations) of the present disclosure.

The battery according to an embodiment of the present disclosure may be a battery having an approximately cylindrical shape with the diameter of approximately 46 mm, the height of approximately 110 mm and the ratio of form factor of approximately 0.418.

The battery according to another embodiment may be a battery having an approximately cylindrical shape with the diameter of approximately 48 mm, the height of approximately 75 mm and the ratio of form factor of approximately 0.640.

The battery according to another embodiment may be a battery having an approximately cylindrical shape with the diameter of approximately 48 mm, the height of approximately 110 mm and the ratio of form factor of approximately 0.436.

The battery according to another embodiment may be a battery having an approximately cylindrical shape with the diameter of approximately 48 mm, the height of approximately 80 mm, and the ratio of form factor of approximately 0.600.

The battery according to another embodiment may be a battery having an approximately cylindrical shape with the diameter of approximately 46 mm, the height of approximately 80 mm, and the ratio of form factor of approximately 0.575.

Conventionally, batteries having the ratio of form factor of approximately 0.4 or less have been used. That is, for example, 1865 battery and 2170 battery have been used. The 1865 battery has the diameter of approximately 18 mm, the height of approximately 65 mm and the ratio of form factor of approximately 0.277. The 2170 battery has the diameter of approximately 21 mm, the height of approximately 70 mm and the ratio of form factor of approximately 0.300.

Figure 9:
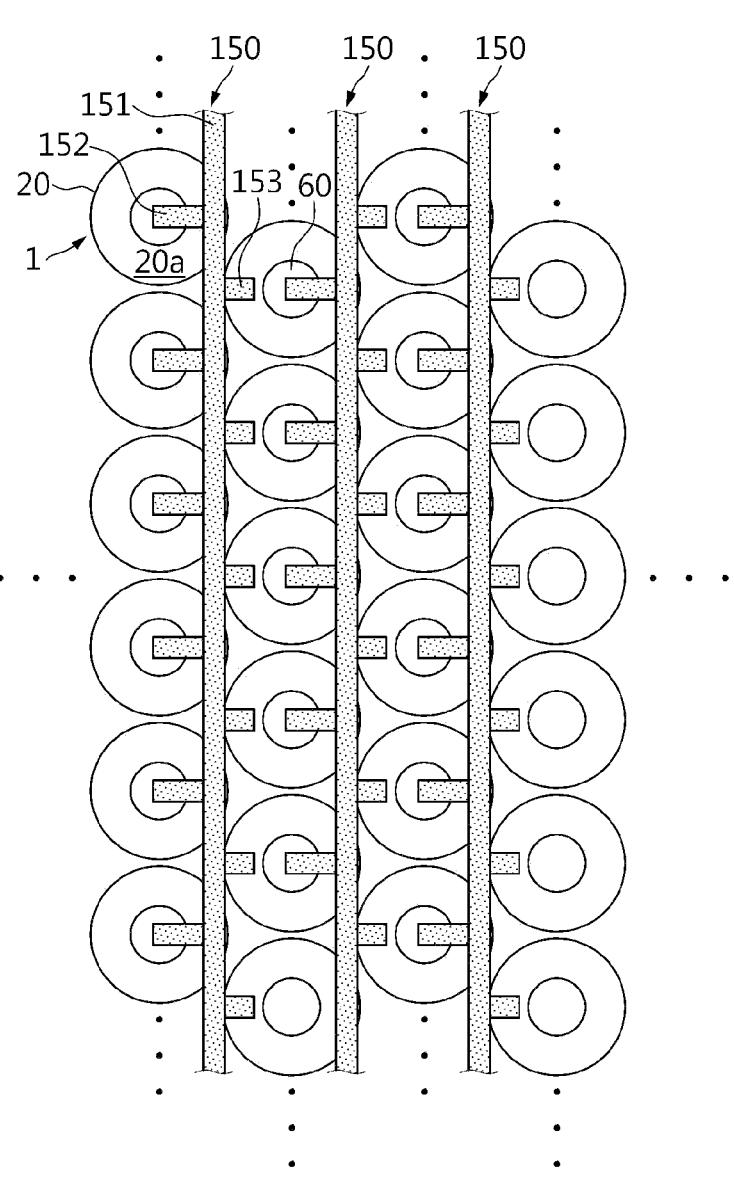
FIG. 9 is a top view showing a plurality of batteries according to an embodiment of the present disclosure connected in series and in parallel using busbars.

Referring to FIG. 9, the plurality of batteries 1 may be connected in series and in parallel using busbars 150 on the batteries 1. The number of batteries 1 may be smaller or larger, considering the capacity of a battery pack.

In each battery 1, the terminal 60 may have the positive polarity, and the outer surface 20*a* of the closed portion of the housing 20 may have the negative polarity, and vice versa.

Preferably, the plurality of batteries 1 may be arranged in a plurality of columns and rows. The column is a vertical direction in the drawing, and the row is a horizontal direction in the drawing. Additionally, in order to maximize the space efficiency, the batteries 1 may be arranged in a closest packing structure. The closest packing structure is formed by connecting the centers of the terminals 60 exposed beyond the housing 20 into an equilateral triangle shape. Preferably, the busbars 150 may be arranged above the plurality of batteries 1, more preferably between adjacent columns. Alternatively, the busbars 150 may be between adjacent rows.

Preferably, the busbar 150 connects in parallel the batteries 1 arranged in the same column, and connects in series the batteries 1 arranged in two adjacent columns.

Preferably, the busbar 150 may include a body portion 151, a plurality of first busbar terminals 152 and a plurality of second busbar terminals 153 for serial and parallel connection.

The body portion 151 may be extended between the terminals 60 of the adjacent batteries 1, and preferably between the columns of the batteries 1. Alternatively, the body portion 151 may be extended along the columns of the batteries 1 and may be bent regularly, for example, in a zigzag pattern.

The plurality of first busbar terminals 152 may be protruded and extended from one side of the body portion 151 toward the terminal 60 of each battery 1 and may be electrically coupled to the terminal 60. The electrical coupling between the first busbar terminal 152 and the terminal 60 may be made by laser welding and ultrasonic welding. Additionally, the plurality of second busbar terminals 153 may be electrically coupled to the outer surface 20*a* of each battery 1 from the other side of the body portion 151. The electrical coupling between the second busbar terminal 153 and the outer surface 20*a* may be made by laser welding and ultrasonic welding.

Preferably, the body portion 151, the plurality of first busbar terminals 152 and the plurality of second busbar terminals 153 may be formed of a single conductive metal plate. The metal plate may be, for example, an aluminum plate or a copper plate, but the present disclosure is not limited thereto. In a variation, the body portion 151, the plurality of first busbar terminals 152 and the plurality of second busbar terminals 153 may be separately manufactured in the unit of a piece and then coupled to each other, for example, through welding.

Since the battery 1 according to the present disclosure includes the terminal 60 having the positive polarity and the outer surface 20*a* of the closed portion of the housing 20 having the negative polarity in the same direction, it is possible to easily establish the electrical connection of the batteries 1 using the busbars 150.

Additionally, since the terminal 60 of the battery 1 and the outer surface 20*a* of the closed portion of the housing 20 have large areas, it is possible to ensure adequate coupling area of the busbars 150, thereby sufficiently reducing the resistance of the battery pack including the batteries 1.

Figure 10:
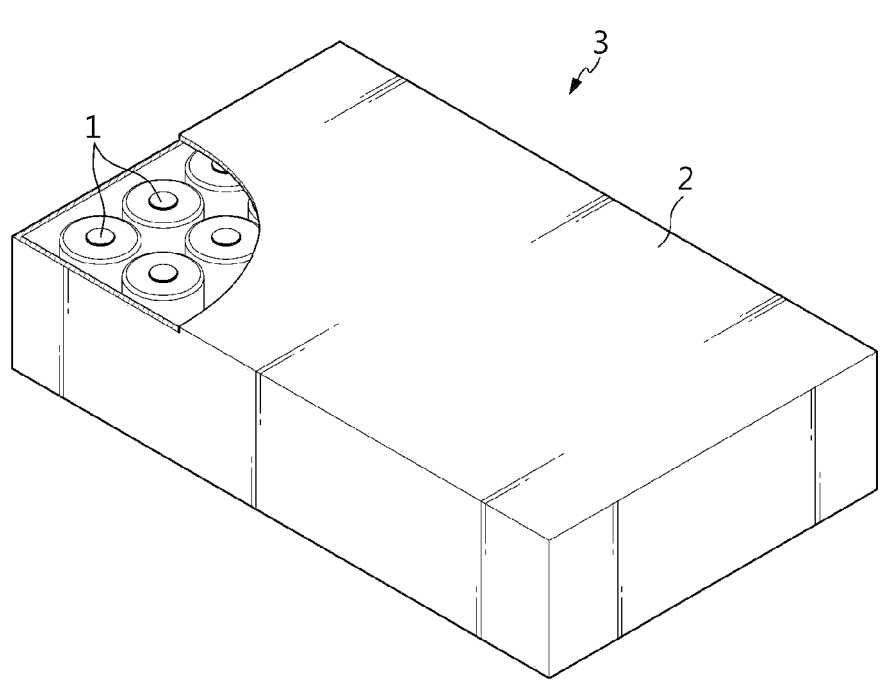
FIG. 10 is a schematic view showing a battery pack according to an embodiment of the present disclosure.

Referring to FIG. 10, the battery pack 3 according to an embodiment of the present disclosure includes a battery assembly including a plurality of batteries 1 according to an embodiment of the present disclosure as described above electrically connected to each other and a pack housing 2 accommodating the secondary battery assembly. The electrical connection structure of the plurality of batteries 1 through the busbars is described above with reference to FIG. 9 for illustrative purposes, and for convenience of illustration in the drawings, components such as a cooling unit and a power terminal are omitted.

Figure 11:
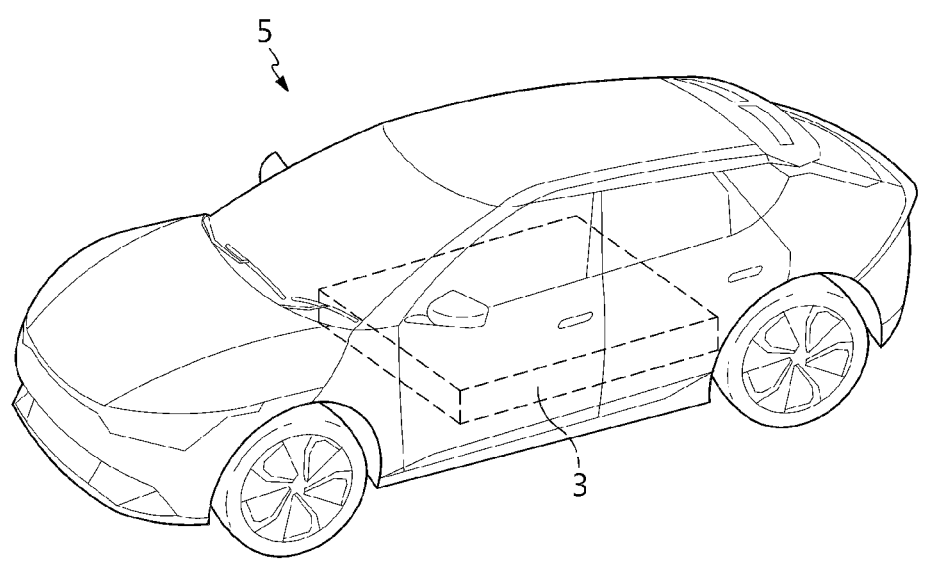
FIG. 11 is a conceptual diagram showing a vehicle according to an embodiment of the present disclosure.

Referring to FIG. 11, a vehicle 5 according to an embodiment of the present disclosure may be, for example, an electric vehicle, a hybrid electric vehicle and a plugin hybrid electric vehicle, and includes the battery pack 3 according to an embodiment of the present disclosure. The vehicle 5 includes a four-wheeler and a two-wheeler. The vehicle 5 operates using the power supplied from the battery pack 3 according to an embodiment of the present disclosure.

While the present disclosure has been hereinabove described with regard to a limited number of embodiments and drawings, the present disclosure is not limited thereto and it is obvious to those skilled in the art that a variety of modifications and changes may be made thereto within the technical aspects of the present disclosure and the equivalent scope of the appended claims.

DESCRIPTION OF REFERENCE NUMERALS

5: Vehicle
3: Battery pack
2: Pack housing
1: Battery
10: Electrode assembly
11: First uncoated region
12: Second uncoated region
C: Winding center hole
20: Housing
20*a*: First electrode terminal
21: Beading portion
22: Crimping portion
30: First current collector
31: Support portion
32: Uncoated region coupling portion
33: Housing contact portion
H1: First current collector hole
BD: Weld portion
40: Cap
41: Venting portion
50: Spacer
H2: Spacer hole
60: Terminal (Second electrode terminal)
G: Insulation gasket
70: Second current collector
80: Insulator
90: Side cover
100: Sealing gasket

What is claimed is:

1. A battery, comprising:

an electrode assembly including a first electrode, a second electrode and a separator between the first electrode and the second electrode, the first electrode, the second electrode and the separator being wound around a winding axis to define a core and an outer circumferential surface of the electrode assembly, the first electrode having a first uncoated region in which an active material layer is not coated along a winding direction;

a housing accommodating the electrode assembly through an open portion at a lower end of the housing;

a first current collector coupled to the first uncoated region, the first current collector being disposed in the housing;

a cap configured to cover the open portion; and a spacer between the first current collector and the cap, the spacer having a height corresponding to a distance between the first current collector and the cap.

2. The battery according to claim 1, wherein the spacer is disposed at a center portion on a first surface of the first current collector.

3. The battery according to claim 1, wherein the first current collector includes:

a support portion disposed at a center portion on a first surface of the electrode assembly;

an uncoated region coupling portion extending from the support portion, the uncoated region coupling portion being coupled to the first uncoated region; and a housing contact portion extending from the support portion or an end of the uncoated region coupling portion, the housing contact portion being electrically coupled to the housing.

4. The battery according to claim 3, wherein the spacer covers the support portion of the first current collector so as to prevent the support portion from being exposed beyond the spacer.

5. The battery according to claim 3, wherein an outer diameter of an upper end of the spacer facing the first current collector is equal to or larger than an outer diameter of the support portion.

6. The battery according to claim 3, wherein the spacer covers at least a part of a weld portion connecting the uncoated region coupling portion of the first current collector and the first uncoated region.

7. The battery according to claim 6, wherein a radius of an upper end of the spacer facing the first current collector is larger than a distance from the weld portion closest to the core of the electrode assembly to the core of the electrode assembly.

8. The battery according to claim 1, wherein the cap includes a venting portion having a smaller thickness than a surrounding region of the cap.

9. The battery according to claim 8, wherein the venting portion is configured to rupture when an internal pressure of the housing increases above a predetermined level.

10. The battery according to claim 8, wherein the venting portion is a notching portion formed on at least one of two opposed surfaces of the cap.

11. The battery according to claim 8, wherein the venting portion forms a closed loop.

12. The battery according to claim 8, wherein the venting portion is circular.

13. The battery according to claim 8, wherein the venting portion is closer to a sidewall of the cap than a midpoint of a straight line connecting a center of the cap to the sidewall of the cap.

14. The battery according to claim 8, wherein the venting portion extends along an edge of a flat area protruding downward from an edge area of the cap.

15. The battery according to claim 8, wherein the spacer is located more inward toward the core than the venting portion so as not to cover the venting portion of the cap.

16. The battery according to claim 8, wherein a radius of a lower end of the spacer facing the cap is smaller than a distance from a center of the cap to the venting portion.

17. The battery according to claim 1, wherein the spacer includes a spacer hole at a location corresponding to a winding center hole of the electrode assembly.

18. The battery according to claim 3, wherein the support portion includes a first current collector hole at a location corresponding to a winding center hole of the electrode assembly.

19. The battery according to claim 1, further comprising:

a side cover covering at least a part of the outer circumferential surface of the electrode assembly, the side cover contacting an inner circumferential surface of the housing.

20. The battery according to claim 19, wherein the at least the part of the outer circumferential surface of the electrode assembly covered by the side cover extends along an outer circumference of the electrode assembly.

21. The battery according to claim 20, wherein the side cover has a thickness corresponding to a distance between the outer circumferential surface of the electrode assembly and the inner circumferential surface of the housing.

22. The battery according to claim 3, wherein the housing includes:

a beading portion formed by press-fitting around an outer circumferential surface the housing; and a crimping portion extended and bent such that an end defining the open portion surrounds an edge of the cap below the beading portion.

23. The battery according to claim 22, wherein the housing contact portion contacts a first surface of the beading portion facing the cap.

24. The battery according to claim 1, wherein the second electrode includes a second uncoated region in which the active material layer is not coated along the winding direction.

25. The battery according to claim 24, further comprising:

a second current collector coupled to the second uncoated region; and an insulator disposed between a closed portion at an upper end of the housing and the second current collector.

26. The battery according to claim 25, wherein the insulator has a height corresponding to a distance between the second current collector and the closed portion.

27. The battery according to claim 1, wherein the spacer is made of an elastic material.

28. The battery according to claim 1, wherein a resistance measured between a positive electrode of the battery and a negative electrode of the battery is 4 milliohm or less.

29. The battery according to claim 1, wherein a ratio of a form factor of the battery is larger than 0.4, the ratio of the form factor of the battery being calculated by dividing a diameter of the battery by a height of the battery.

30. A battery pack comprising a plurality of the batteries according to claim 1.

31. The battery pack according to claim 30, wherein each battery further includes a terminal opposite to the open portion, the terminal being electrically connected to the second electrode.

32. The battery pack according to claim 31, wherein the plurality of batteries is arranged in a predetermined number of columns, and wherein each terminal and an outer surface of a closed portion of the housing of each battery are positioned upward.

33. The battery pack according to claim 32, comprising:

a plurality of busbars to connect the plurality of batteries in series and in parallel, wherein the plurality of busbars is arranged above the plurality of batteries, and wherein each busbar includes:

a body portion extending between the terminals of the adjacent batteries;

a plurality of first busbar terminals extending from a side of the body portion, the first busbar terminals being electrically coupled to the terminals of the batteries arranged on the first side; and a plurality of second busbar terminals extending from a second side of the body portion opposite the first side, the second busbar terminals being electrically coupled to the outer surfaces of the closed portions of the housings of the batteries arranged on the second side.

34. A vehicle comprising the battery pack according to claim 31.

* * * * *